(12) United States Patent
Saitoh et al.

(10) Patent No.: US 7,160,003 B2
(45) Date of Patent: Jan. 9, 2007

(54) ILLUMINATION DEVICE AND DISPLAY DEVICE INCORPORATING THE SAME

(75) Inventors: Goroh Saitoh, Tokyo (JP); Masao Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 151 days.

(21) Appl. No.: 11/052,765

(22) Filed: Feb. 9, 2005

(65) Prior Publication Data
US 2005/0180169 A1 Aug. 18, 2005

(30) Foreign Application Priority Data
Feb. 16, 2004 (JP) ............................. 2004-038571

(51) Int. Cl.
*F21V 5/00* (2006.01)
(52) U.S. Cl. ...................... 362/330; 362/97; 362/606; 362/619; 362/626
(58) Field of Classification Search ................. 362/97, 362/330, 339, 606, 619, 626; 349/63
See application file for complete search history.

(56) References Cited

U.S. PATENT DOCUMENTS 6,079,844 A * 6/2000 Whitehead et al. ........... 362/97
6,561,663 B1 * 5/2003 Adachi et al. .............. 362/616
6,814,456 B1 * 11/2004 Huang et al. ................. 362/30
6,964,497 B1 * 11/2005 Greiner ....................... 362/241

FOREIGN PATENT DOCUMENTS

JP 2001-023423 1/2001
JP 2002-352611 12/2002

* cited by examiner

*Primary Examiner*—Sandra O'Shea
*Assistant Examiner*—Jason Moon Han
(74) *Attorney, Agent, or Firm*—Young & Thompson

(57) ABSTRACT

Light emitted from a light source and incident on a light distributor of a light guide plate is partially emitted from the light guide plate as it is, and is predominantly reflected toward a prism section. Light incident on the prism section from the light distributor and light incident on the prism section directly from the light source are refracted and reflected by the prism section, and are then emitted from a light emission plane of the light guide plate in a region away from the light source in which the light distributor is not disposed, in a direction perpendicular to the light emission plane and substantially away from light source.

21 Claims, 16 Drawing Sheets

ILLUMINATION DEVICE AND DISPLAY DEVICE INCORPORATING THE SAME

BACKGROUND OF THE INVENTION

1. Field of the Invention

The present invention relates to an illumination device and a display device incorporating the same, and more particularly, to an illumination device which provides a uniform light emission distribution at a high efficiency, a back light for a liquid crystal display device, and a liquid crystal display device which incorporates the back light for a liquid crystal display device.

2. Description of the Related Art

In recent years, liquid crystal display devices have been increased in screen size, and have found wider applications in liquid crystal televisions and the like. While the liquid crystal display device consumes lower power than conventional CRT and the like, the power consumed by a back light for the liquid crystal display device (illumination device associated with the liquid crystal display device) has become a growing problem as the screen size has been increased, because the back light consumes a majority of the power consumed by the overall liquid crystal display device. In addition, lower cost is requested for back lights for liquid crystal display devices in order to provide the liquid crystal display devices at lower cost.

As illustrated in FIG. 1, a conventional back light for a liquid crystal display device (liquid crystal BL) comprises a plurality of cold cathode fluorescent lamps (CCFL) 102 arranged side by side; a housing which is covered with a reflective sheet and surrounds the CCFLs; a diffusion plate 101 placed on an emission plane of the housing for uniformizing a light emission distribution; and an optical sheet 103 (lens sheet or the like) laminated on the diffusion plate for converging emitted light. In this structure, light emitted from CCFLs is uniformized while repeating reflections between the diffusion plate and the reflective sheet, and emitted through the diffusion plate. In this event, since the light is absorbed by the diffusion plate, reflective sheet, or CCFLs, only approximately 60% of the emitted light from CCFLs is outgoing through the diffusion plate when the used diffusion plate has a typical transmissivity of approximately 50% and reflectivity of approximately 50%. The resulting low energy efficiency contributes to increased power consumption. Liquid crystal BLs are expensive, because lens shape etc. are formed on a thin sheet and a plurality of optical sheets are used in a back light, which results in an obstacle to reduce the cost of liquid crystal BL.

Specification etc. of Japanese Patent Laid-open Publication No. 2002-352611 discloses a liquid crystal BL which does not employ the diffusion plate as described above (pages 1–3, FIG. 1). The disclosed illumination device has a Fresnel lens arranged on an emission plane to have a high directivity and a relatively uniform intensity distribution. Also, specification etc. of Japanese Patent Laid-open Publication No. 2001-23423 (FIG. 2) discloses a light guide member formed with a blind hole for distributing incident light from a light source from side to side for a uniform distribution of light.

However, the illumination device disclosed in specification etc. of Japanese Patent Laid-open Publication No. 2002-352611 exhibits the uniformity which is merely about 60% of a maximum value across the overall range of a unit Fresnel lens (part of the liquid crystal BL), as illustrated in FIG. 14, and hence suffers from insufficient uniformity.

The illumination device disclosed in specification etc. of Japanese Patent Laid-open Publication No. 2001-23423, in turn, uniformly expands light from a light source through an optical path transformation to make the light nondirectional, and therefore requires light converging means in addition to the light guide member, causing an increase in cost. Further, this illumination device falls under an edge light scheme, and does not take into consideration light incident from out of plane, rather than the side surface of the light guide member. As such, this illumination device cannot be employed as an illumination device generally employed in large liquid crystal display devices, i.e., an illumination device of the type in which light is incident on an uniformizing member (the diffusion plate in FIG. 1) from out-of-plane of the uniformizing member.

SUMMARY OF THE INVENTION

It is an object of the present invention to provide an illumination device which exhibits a uniform light emission distribution and a narrow emission light angle distribution, is inexpensive, and is capable of using light incident from out-of-plane of an uniformizing member for illumination.

An illumination device comprise a light source; and a light guide plate for receiving light from said light source on a light incident plane thereof and emitting the light from a light emission plane thereof. The light guide plate includes a light distributor disposed on said light emission plane, and a prism section disposed on said light incident plane. The light distributor is configured to cause part of the light incident from said light source to emit from said light guide plate as it is, and to reflect at least part of remaining light toward said prism section. The prism section is configured to refract and reflect the light incident thereon from said light distributor and the light incident thereon directly from said light source to guide at least part of the light to said light emission plane. The illumination device satisfies the following equation:

$$D \le P < \frac{2(r+d)}{\tan\left\{90° - \sin^{-1}\left(\frac{1}{n}\right)\right\}} + D$$

where r represents a distance between said light source and said light incident plane; d represents a thickness of said light guide plate; D represents a width of said light source in a direction parallel with said light emission plane; P represents a width of said light distributor in a direction parallel with said light emission plane; and n represents a relative refractive index of said light guide plate to air.

According to another embodiment, an illumination device comprises a light source, and a light guide plate for receiving light from said light source on a light incident plane thereof and emitting the light from a light emission plane thereof. The light guide plate includes a light distributor disposed on said light incident plane, and a prism section disposed on said light incident plane in a region in which said light distributor is not disposed. The light distributor is configured to cause part of the light incident from said light source to emit from said light guide plate as it is, and to refract at least part of remaining light so that said light is reflected by said light emission plane. The prism section is configured to refract and reflect the light reflected by said light emission plane and incident thereon and the light incident thereon directly from said light source to guide at least part of the light to said light emission plane. The illumination device satisfies the following equation:

$$D \le P < \frac{2r}{\tan\left\{90° - \sin^{-1}\left(\frac{1}{n}\right)\right\}} + D$$

where r represents a distance between said light source and said light incident plane; D represents a width of said light source in a direction parallel with said light emission plane; P represents a width of said light distributor in a direction parallel with said light emission plane; and n represents a relative refractive index of said light guide plate to air.

BRIEF DESCRIPTION OF THE DRAWINGS

FIG. 13 is a schematic diagram showing a path of light which is reflected by a light distributor, incident on prism plane 3a of a prism section, refracted in a direction closer to a light source than the direction perpendicular to prism plane 3a, and then transmits prism plane 3a;

FIG. 14 is a schematic diagram showing a path of light which is reflected by a light distributor, incident on prism plane 3a of a prism section, refracted in a direction closer to an illumination than the direction perpendicular to prism plane 3a, and then transmits prism plane 3a;

DETAILED DESCRIPTION OF THE PREFERRED EMBODIMENTS

Figure 1:
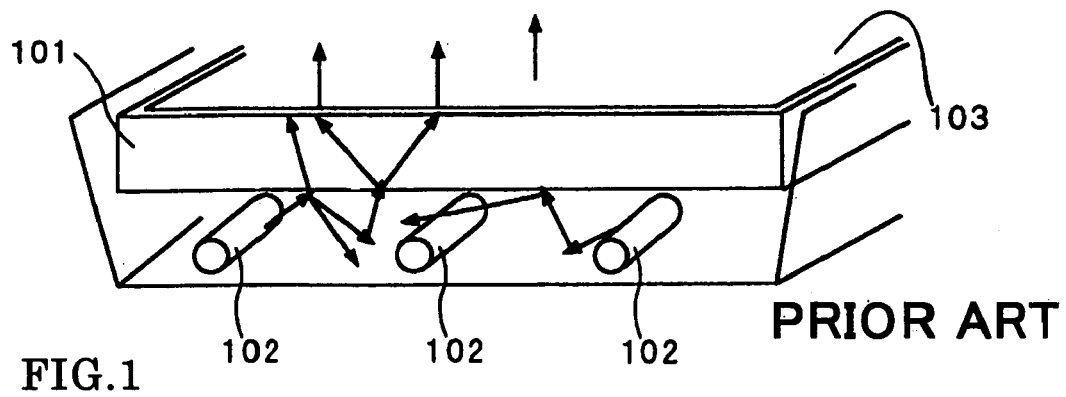
FIG. 1 is a schematic diagram of a conventional back light for a liquid crystal display device.
Figure 2:
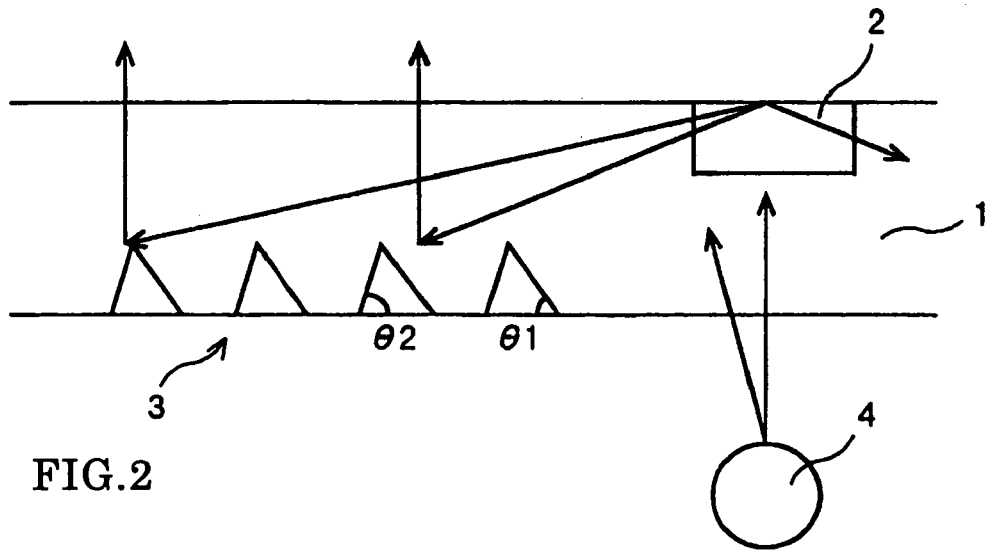
FIG. 2 is a schematic diagram illustrating the configuration of an illumination device according to the present invention.

Embodiments of the present invention will next be described in detail with reference to the accompanying drawings. FIG. 2 is a schematic cross-sectional view of an illumination device according to a first embodiment. In this embodiment, light distributor 2 is disposed on a light emission plane of light guide plate 1 in a region substantially above light source 4 and receives relatively strong emitted light, and prism section 3 is disposed on a light incident plane of light guide plate 1. Light distributor 2 permits part of emitted light to exit as it is from light guide plate 1, and reflects at least part of the remaining light toward prism section 3. Prism section 3 refracts and reflects light incident thereon from light distributor 2 and light incident thereon directly from light source 4, and guides at least part of the incident light toward the light emission plane of light guide plate 1.

Next, description will be made on the operation of the illumination device according to the first embodiment. Light emitted from light source 4 and incident on light distributor 2 in light guide plate 1 is partially emitted from light guide plate 1 as it is, and a majority of the remaining light is reflected toward prism section 3. The light reflected by light distributor 2 and incident on prism section 3, and the light directly incident on prism section 3 from light source 4 are refracted and reflected by prism section 3, and a majority of the light is emitted from the light emission plane of light guide plate 1 in a region away from light source 4 in which light distributor 2 is not disposed, in a direction perpendicular to the light emission plane and substantially away from light source (hereinafter referred to as the "illumination direction").

A typical illumination device emits stronger light in a region substantially above light source 4 and weaker light at regions away from the light source such as between light sources. In this embodiment, on the other hand, strong light emitted in a region substantially above light source 4 is distributed by light distributor 2 to regions away from light source 4 such as between light sources, and is emitted in the illumination direction by prism section 3 in regions away from light source 4 in which light distributor 2 is not disposed, thereby making it possible to uniformly distribute the emitted light.

For the uniform distribution of emitted light, light distributor 2 must be disposed at an appropriate position. It is also necessary to set the angles of prism surfaces of prism section 3 for efficiently emitting light incident on prism section 3 in the illumination direction from the light emission plane of light guide plate 1. It should be taken into consideration that the light incident on prism section 3 includes light directly incident thereon from light source 4, and light from light source 4 reflected by light distributor 2 to be incident on the prism section 3. Further, light distributor 2 has a reflection plane, the angle of which must be set such that light reflected by light distributor 2 is incident on prism section 3 away from light source 4.

First, the location at which light distributor 2 should be disposed will be described with reference to FIG. 3.

Light distributor 2 is intended to emit part of light incident thereon from light source 4 in the illumination direction from the emission plane of light guide plate 1, and to reflect the remaining light to be incident on prism section 3. Light which has traveled within light guide plate 1 includes light which has an incident angle larger than a critical angle when it transmits the light emission plane of light guide plate 1 to propagate into air. Since this light does not transmit the light emission plane of light guide plate 1, light distributor 2 does not function when the light is incident on light distributor 2 at an angle larger than the critical angle. The above-mentioned critical angle x is expressed by equation (1):

$$x = \sin^{-1}\left(\frac{1}{n}\right) \quad (1)$$

where n represents a relative refractive index of light guide plate 1 to air.

Figure 3:
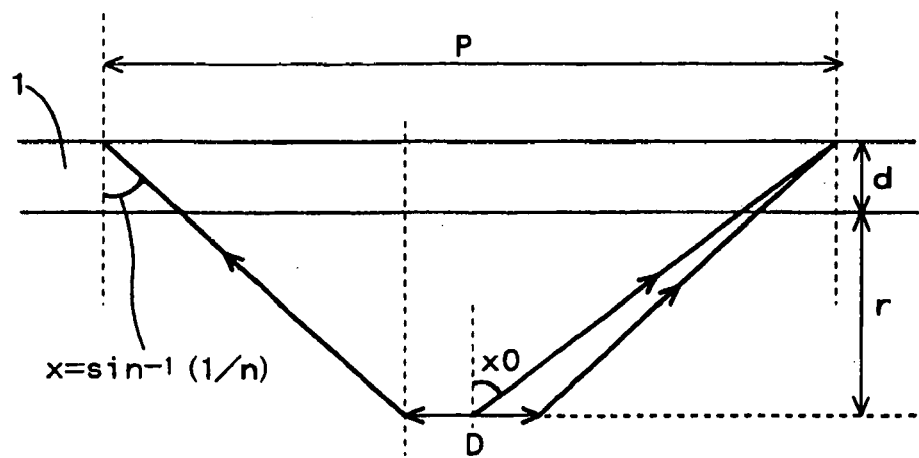
FIG. 3 is a schematic diagram showing the width necessary for a light distributor.

Therefore, as shown in FIG. 3, when light distributor 2 is placed on the light emission plane of light guide plate 1, centered at the intersection of a normal line drawn from light source 4 to the light incident plane of light guide plate 1 with the light incident plane, required width P of light distributor 2 in a direction parallel with the light emission plane is expressed by equation (2) from a geometrical relationship in FIG. 3:

$$P < \frac{2(r+d)}{\tan\left\{90° - \sin^{-1}\left(\frac{1}{n}\right)\right\}} + D \quad (2)$$

where r represents the distance between light source 4 and the light incident plane of light guide plate 1; d the thickness of light guide plate 1; and D the width of light source 4 in a direction parallel with the light emission plane of light guide plate 1. Actually, light incident on light guide plate 1 is refracted on the light incident plane of light guide plate 1, and the angle of refraction is smaller than the incident angle. However, since it can be thought that there is only a small amount of light which is not incident on light distributor 2 having width P which satisfies the foregoing equation (2) and exits from the light emission plane of light guide plate 1, a maximum of width P for light distributor 2 may be calculated on the assumption that the light travels straight without taking into account the reflection of the light on the light incident plane of light guide plate 1, as shown in FIG. 3. This manner of calculation will not cause any problem.

Since the width of the region which receives a large amount of light from light source 4 is at least larger than that of light source 4, width P required for light distributor 2 is expressed by equation (3) when light distributor 2 is disposed on the side of light emission plane of light guide plate 1:

$$D \le P < \frac{2(r+d)}{\tan\left\{90° - \sin^{-1}\left(\frac{1}{n}\right)\right\}} + D \quad (3)$$

Now, consider how to find the incident angle of light which is incident on light distributor 2. Assuming that incident angle x0 of light from light source 4 incident on light distributor 2 (angle formed by the light with a direction perpendicular to the light incident plane of light guide plate 1) has maximum value x0(max), equation (4.A) is derived from the geometrical relationship shown in FIG. 3, and equation (4.A) can be transformed into equation (4.B):

$$\tan\{x0(\max)\} = \frac{P}{2 \times (r+d)} \quad (4.A)$$

$$x0(\max) = \tan^{-1}\left\{\frac{P}{2 \times (r+d)}\right\} \quad (4.B)$$

From the foregoing, incident angle x0 of the light incident on light distributor 2 from light source 4 has a range as expressed by equation (4.C):

$$x0 < \tan^{-1}\left\{\frac{P}{2 \times (r+d)}\right\} \quad (4.C)$$

Next, consider angles of prism planes of prism section 3 to the light incident plane of light guide plate 1. In the following, the prism plane close to the closest light source 4 is referred to as "prism plane 3a," and a prism plane remote from the closest light source 4 as "prism plane 3b." The angle of prism plane 3a to the light incident plane of light guide plate 1 is designated by θ1, and the angle of prism plane 3b to the light incident plane of light guide plate 1 by θ2. Assume in the following, that the light incident plane and the light emission plane of light guide plate 1 are parallel with each other.

As mentioned above, the light incident on prism section 3 includes light incident thereon directly from light source 4, and light from light source 4 reflected by light distributor 2 before it is incident on prism section 3.

Figure 4:
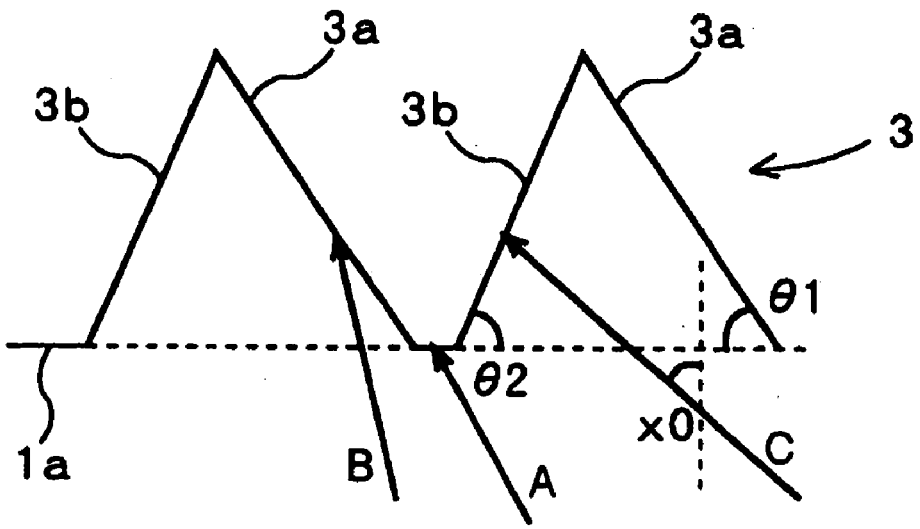
FIG. 4 is a schematic diagram showing light directly incident on a prism section from a light source.

Description will be first made on the angles of the prism planes which should be set for light incident on prism section 3 directly from light source 4. As shown in FIG. 4, light incident on prism section 3 from light source 4 includes light A which is incident on a plane parallel with light guide plate 1 between two adjacent prisms; light B incident on prism plane 3a; and light C incident on prism plane 3b. Among the foregoing light, light C incident on prism plane 3b predominantly includes light having larger angles to the illumination direction. Therefore, by emitting light C in the illumination direction, the amount of emission light in regions other than the location substantially above light source 4 can be increased, thereby uniformizing the amount of light emitted from the illumination device or narrowing down an emission light angle distribution.

The following description will be made on the angles of the prism planes of prism section 3 which should be set in order to emit light C in the illumination direction for the case where incident angle x0 of light C, which is incident on prism plane 3b of prism section 3 directly from light source 4, to the light incident plane of light guide plate 1 is equal to or smaller than angle θ2 of prism plane 3b of prism section 3 to the light incident plane (when x0≦θ2), and for the case where incident angle x0 is larger than angle θ2 (when x0>θ2), respectively. When light incident on prism plane 3b of prism section 3 directly from light source 4 transmits prism plane 3b, the transmitted light forms an angle γ to the light incident plane of light guide plate 1. The refractive index of air is designated by n0; the refractive index of light guide plate 1 by n1; and the relative refractive index of light guide plate 1 to air by n (=n1/n0).

Figure 5:
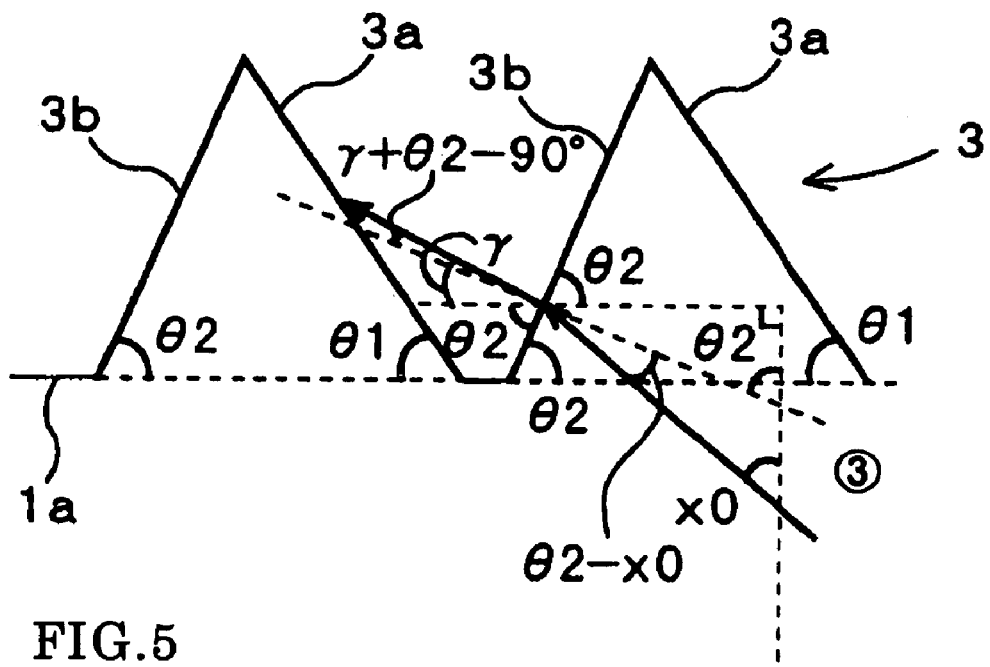
FIG. 5 is a schematic diagram showing a path of light which is directly incident on prism plane 3b of a prism section from a light source and transmits the plane.

Referring to FIG. 5, description will be made on the angles of the prism planes of prism section 3 which should be set in order to emit light C in the illumination direction when x0≦θ2. As shown in FIG. 5, when x0≦θ2, the Snell's law can be applied to light traveling through prism plane 3b to derive equation (5), and equation (5) may be transformed into equation (6):

$$n1 \times \sin(\theta 2 + \gamma - 90°) = n0 \times \sin(\theta 2 - x0) \quad (5)$$

$$\gamma = \sin^{-1}\left\{\frac{1}{n}\sin(\theta 2 - x0)\right\} - \theta 2 + 90° \quad (6)$$

In order that this light is reflected by prism plane 3a of the second prism and emitted in the illumination direction, first of all, light which satisfies equation (6) must be incident on prism plan 3a of the second prism, and for this requirement, equation (7) must be satisfied:

$$\theta 1 > \gamma \quad (7)$$

Figure 6:
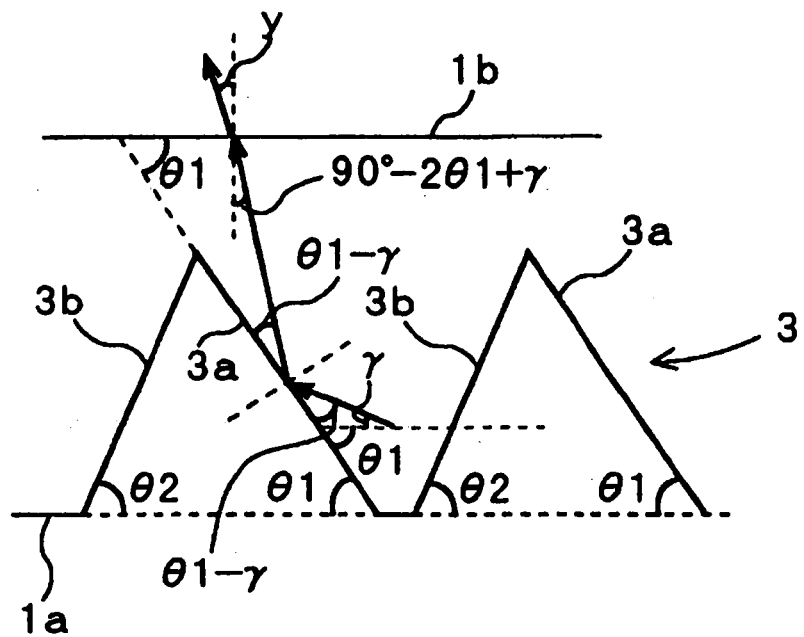
FIG. 6 is a schematic diagram showing a path of light which is directly incident on prism plane 3b of a prism section from a light source, transmits the plane, is reflected by prism plane 3a of an adjacent prism, and is then emitted from a light emission plane of a light guide plate on the left side of a direction perpendicular to the light emission plane.
Figure 7:
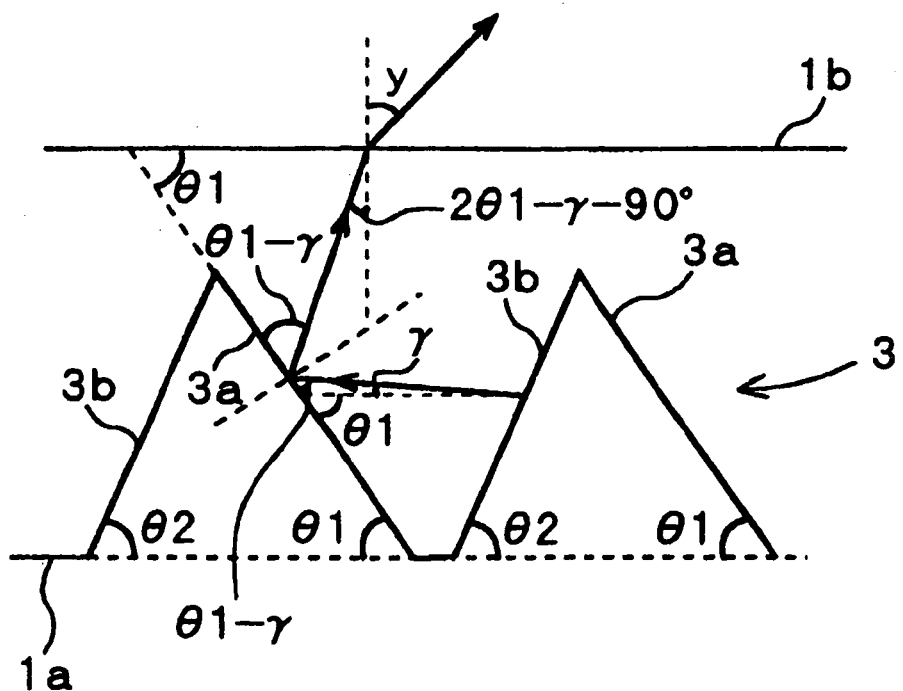
FIG. 7 is a schematic diagram showing a path of light which is directly incident on prism plane 3b of a prism section from a light source, transmits the plane, is reflected by prism plane 3a of an adjacent prism, and is then emitted from a light emission plane of a light guide plate on the right side of a direction perpendicular to the light emission plane.

When light which satisfies the foregoing equations (6) and (7) is emitted from the light emission plane of light guide plate 1 in the illumination direction, the light may be reflected by prism plane 3a of the second prism and emitted on the left side from the direction perpendicular to the light emission plane of light guide plate 1, as shown in FIG. 6, and the light may be reflected by prism plane 3a of the second prism and emitted on the right side from the direction perpendicular to the light emission plane of light guide plate 1, as shown in FIG. 7. Thus, referring to FIGS. 6 and 7, conditions will be found in order that the light satisfying the aforementioned equations (6) and (7) is emitted from the light emission plane of light guide plate 1 in the illumination direction.

In the scenario shown in FIG. 6 where light is emitted on the left side from the direction perpendicular to the light emission plane of light guide plate 1, equation (8) is derived by applying the Snell's law:

$$n1 \times \sin(90° - 2 \times \theta 1 + \gamma) = n0 \times \sin y \quad (8)$$

where y represents the angle formed by light which transmits the light emission plane of light guide plate 1 with the direction perpendicular to the light emission plane of light guide plate 1.

For emitting light in the illumination direction from the light emission plane of light guide plate 1, equation (9) must be satisfied:

$$0 \le y < 90° \quad (9)$$

The following equation (10) is derived from equations (8) and (9):

$$90° - \sin^{-1}\left(\frac{1}{n}\right) < 2 \times \theta 1 - \gamma \leq 90° \quad (10)$$

In the scenario shown in FIG. 7 where light is emitted on the right side from the direction perpendicular to the light emission plane of light guide plate 1, equation (11) is derived by applying the Snell's law:

$$n1 \times \sin(2 \times \theta 1 - \gamma - 90°) = n0 \times \sin y \quad (11)$$

where y represents the angle formed by the light which transmits the light emission plane of light guide plate 1 with the direction perpendicular to the light emission plane of light guide plate 1.

For emitting light in the illumination direction from the light emission plane of light guide plate 1, equation (12) must be satisfied:

$$0 \leq y < 90° \quad (12)$$

The following equation (13) is derived from equations (11) and (12):

$$90° \leq 2 \times \theta 1 - \gamma < 90° + \sin^{-1}\left(\frac{1}{n}\right) \quad (13)$$

When equation (10) or (13) is satisfied, light is reflected by prism plane 3a of the second prism and emitted in the illumination direction from the light emission plane of light guide plate 1, so that when x0≦θ2, equation (14) must be satisfied in order that light C incident on prism plane 3b of prism section 3 is emitted in the illumination direction from the light emission plane of light guide plate 1:

$$90° - \sin^{-1}\left(\frac{1}{n}\right) < 2 \times \theta 1 - \gamma < 90° + \sin^{-1}\left(\frac{1}{n}\right) \quad (14)$$

From the foregoing, equations (6), (7) and (14) must be satisfied in order that light C incident on prism plane 3b of prism section 3 is emitted in the illumination direction from the light emission plane of light guide plate 1 when x0≦θ2.

Figure 8:
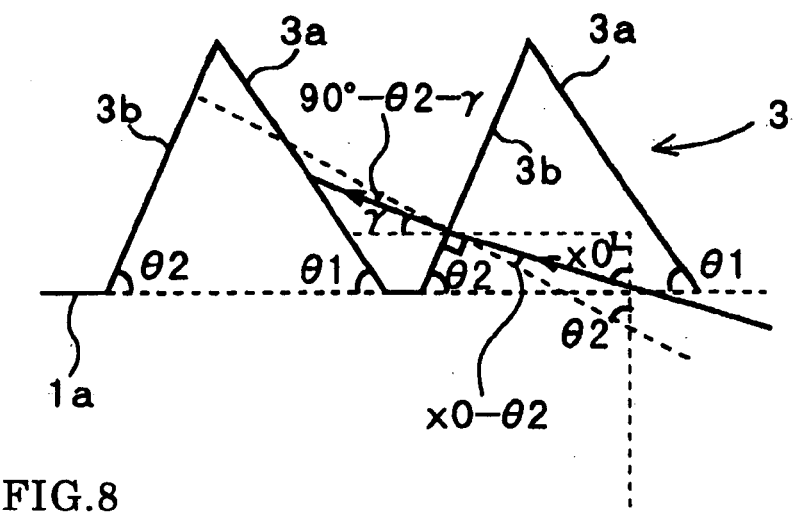
FIG. 8 is a schematic diagram showing a path of light which is directly incident on prism plane 3b of a prism section from a light source and transmits the plane.

Referring next to FIG. 8, description will be made on the angles of the prism planes of prism section 3 which should be set in order to emit light C in the illumination direction when x0>θ2. As shown in FIG. 8, when x0>θ2, the Snell's law may be applied to light traveling through prism plane 3b to derive equation (15), and equation (15) may be transformed into equation (16):

$$n1 \times \sin(90° - \theta 2 - \gamma) = n0 \times \sin(x0 - \theta 2) \quad (15)$$

$$\gamma = 90° - \theta 2 - \sin^{-1}\left\{\frac{1}{n}\sin(\theta 2 - x0)\right\} \quad (16)$$

For emitting the light in the illumination direction from the light emission plane of light guide plate 1, equations (7) and (14) must be satisfied as well when x0>θ2, as is the case with when x0≦θ2.

Figure 9:
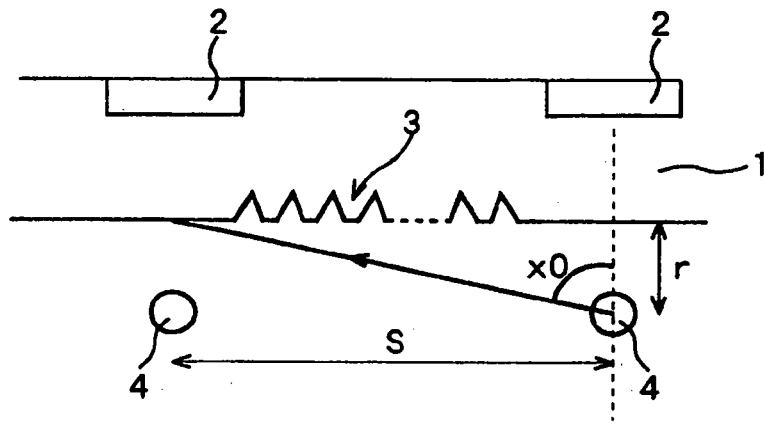
FIG. 9 is a schematic diagram of light which is directly incident on a prism section from a light source.

Paying attention to one arbitrary light source 4, light which is incident on the light incident plane of light guide plate 1 at distance s or more away from this light source 4 is extremely smaller in amount than light which is incident at distance less than s away from light source 4. Therefore, light incident on prism section 3 may be treated to be incident on light incident plane of light guide plate 1 within incident angle x0, which can be in a range expressed by equation (17), as shown in FIG. 9:

$$x0 < \tan^{-1}\left(\frac{s}{r}\right) \quad (17)$$

where s represents the distance between light sources (when there are a plurality of light sources) or the length of light guide plate 1 (when there is a single light source); r the distance between the center of light source 4 or the surface of light source 4 and light guide plate 1; and d the thickness of light guide plate 1.

From the foregoing, in order to emit light which is directly incident on prism plane 3b having angle θ2 to the light incident plane of light guide plate 1 (light labeled C in FIG. 4) in the illumination direction, angle θ2 of prism plane 3b to the light incident plane of light guide plate 1 may be set in accordance with equations (7), (14), (6), (17) when x0≦θ2, while angle θ2 of prism plane 3b to the light incident plane of light guide plate 1 may be set in accordance with equations (7), (14), (16), (17) when x0<θ2.

Figure 10:
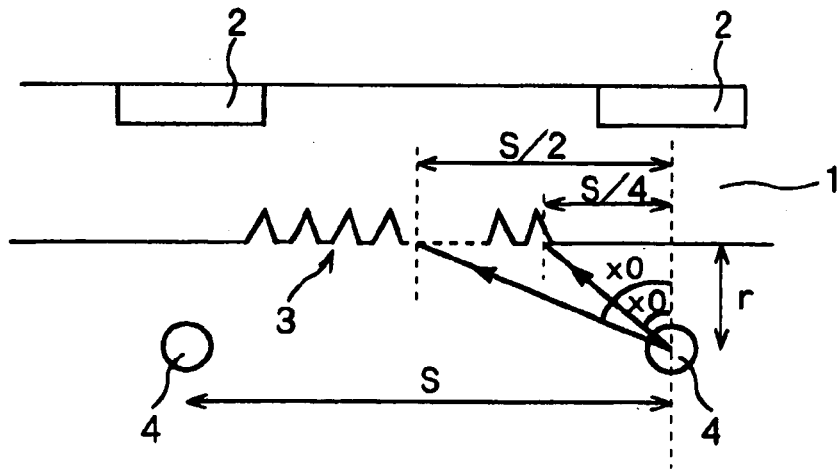
FIG. 10 is a schematic diagram of light which is directly incident on a prism section from a light source.

Since light from light source 4 becomes the most weak near the midpoint between adjacent light sources, angle θ2 of prism plane 3b to the light incident plane of light guide plate 1 is preferably set such that the light incident on prism section 3 directly from light source 4 which is found near the midpoint of light sources, i.e., the light, the incident angle x0 of which satisfies equation (18), as shown in FIG. 10, is emitted in the illumination direction from the light emission plane of light guide plate 1:

$$\tan^{-1}\left(\frac{s}{4 \times r}\right) \leq x0 \leq \tan^{-1}\left(\frac{s}{2 \times r}\right) \quad (18)$$

Next, description will be made on the angles of the prism planes which should be set in order to emit light in the illumination direction from the light emission plane of light guide plate 1, when light from light source 4 is reflected by light distributor 2 before it is incident on prism section 3.

Figure 11:
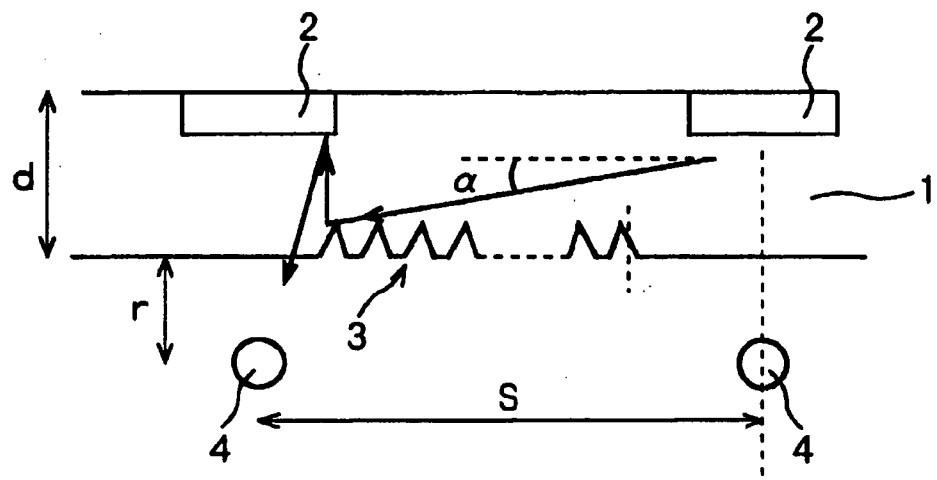
FIG. 11 is a schematic diagram showing a path of light which is reflected by a light distributor, again incident on an adjacent light distributor through a prism section, reflected by the light distributor, and emitted from a light incident plane of a light guide plate.

First, as a precondition for discussing the angles of the prism planes to be set, consider a range for angle α which should be taken into account in setting the angles of the prism planes, wherein α designates the angle formed by light incident on prism section 3 with the light emission plane of light guide plate 1. As shown in FIG. 11, when light reflected from light distributor 2 associated with one arbitrary light source 4 is again incident on light distributor 2 associated with the adjacent light source, the light will travel along a path reverse to the distribution and be emitted toward the adjacent light source, so that the light will not be exploited for illumination. Therefore, the angle α may be limited to a range which satisfies equation (19), where d represents the thickness of light guide plate 1, and s represents the distance between light sources (the length of light guide plate 1 when there is one light source), so that the angles of the prisms may be set only for light which satisfies equation (19). This means, from a viewpoint of setting a reflection plane of light distributor 2, that the angle of the reflection plane of light distributor 2 should be set such that a largest possible amount of reflected light satisfies equation (19):

$$\alpha > \tan^{-1}\left(\frac{d}{s}\right) \tag{19}$$

Figure 12:
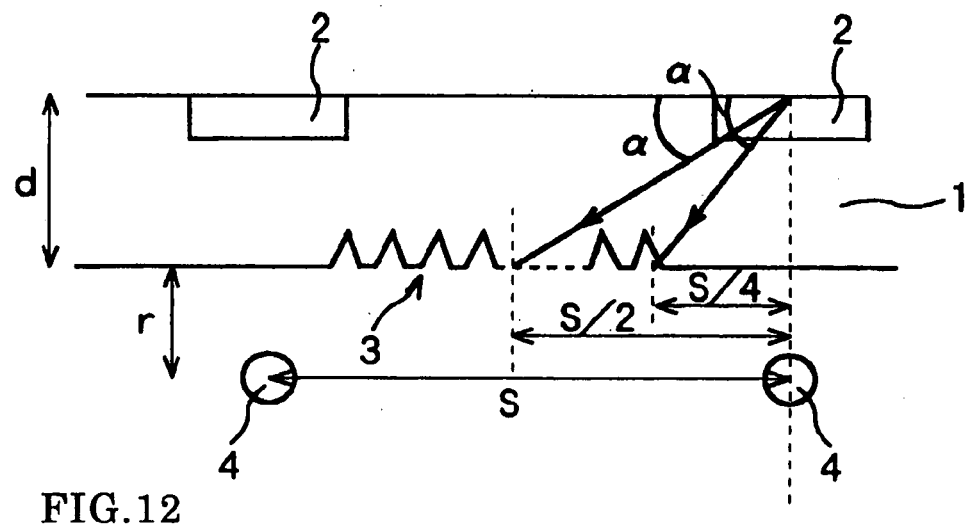
FIG. 12 is a schematic diagram showing a path of light which is reflected by a light distributor and incident on a prism section.

Further, since light from light source 4 becomes the most weak near the midpoint between light sources, the angles of prism planes are preferably determined such that a largest possible amount of reflected light incident near the midpoint between the light sources is emitted in the illumination direction by the prism section. For example, as shown in FIG. 12, reflected light incident near the midpoint between the light sources preferably includes one which has an angle to the light emission plane of light guide plate 1, the range of which satisfies that expressed by equation (20). This means, from a viewpoint of setting a reflection plane of light distributor 2, that the reflection plane is preferably set such that reflected light from light distributor 2 tends to concentrate near the midpoint between the light sources, and the angle of the reflection plane of light distributor 2 is preferably set such that angle α of reflected light from light distributor 2 to the light emission plane falls within a range which satisfies equation (20):

$$\tan^{-1}\left(\frac{2 \times d}{s}\right) \le \alpha \le \tan^{-1}\left(\frac{4 \times d}{s}\right) \tag{20}$$

Next, description will be made on the angles of the prism planes which should be set in order to emit the light in the illumination direction, when light from light source 4 is reflected by light distributor 2 and incident on prism section 3. The following description is made on the assumption that the range for angle α of reflected light from light distributor 2 to the light emission plane falls under the range expressed by equation (19).

Figure 13:
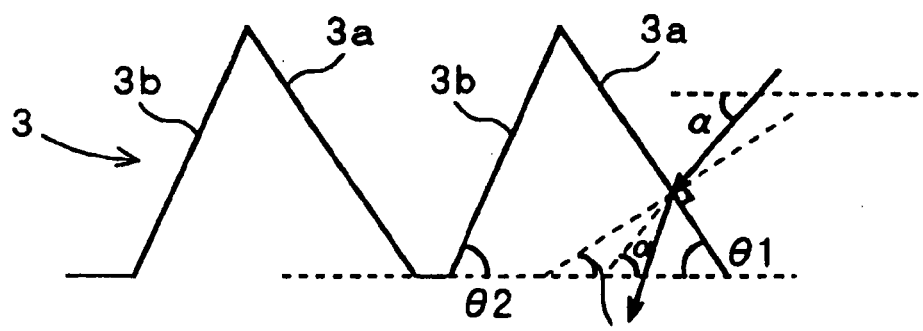

The angle of reflected light from light distributor 2 (angle formed by reflected light with the light emission plane of light guide plate 1) is designated by α, and the angle of prism plane 3a close to the light source to the light incident plane of light guide plate 1 is designated by θ1. Since light guide plate 1 has a refractive index larger than air, a larger amount of reflected light from light distributor 2 is emitted toward the light source from light guide plate 1 through prism section 3, as shown in FIG. 13, when equation (21) is satisfied:

$$90° - \theta1 < \alpha \tag{21}$$

Figure 14:
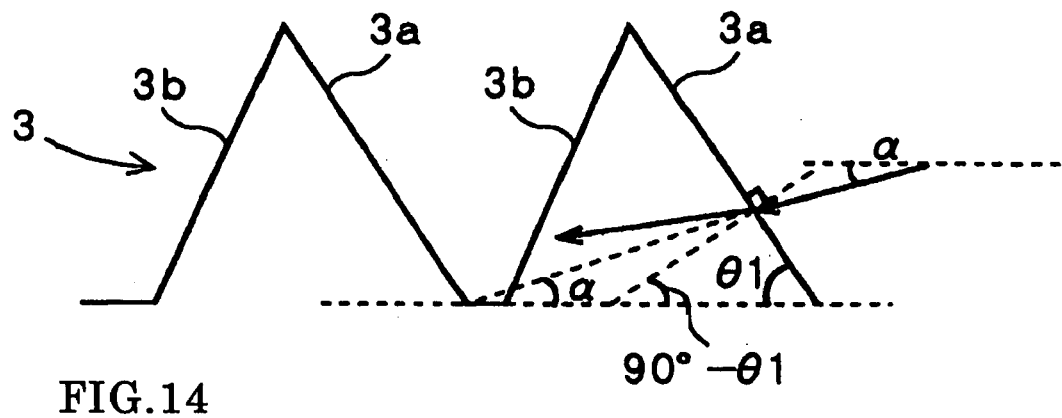

Therefore, for increasing the amount of reflected light from light distributor 2 which is emitted in the illumination direction from the light emission plane of light guide plate 1 through prism section 3, angle θ1 of prism plane 3a close to the light source to the light incident plane of light guide plate 1 must be set to satisfy equation (22), as shown in FIG. 14:

$$90° - \theta1 \ge \alpha \tag{22}$$

Figure 15:
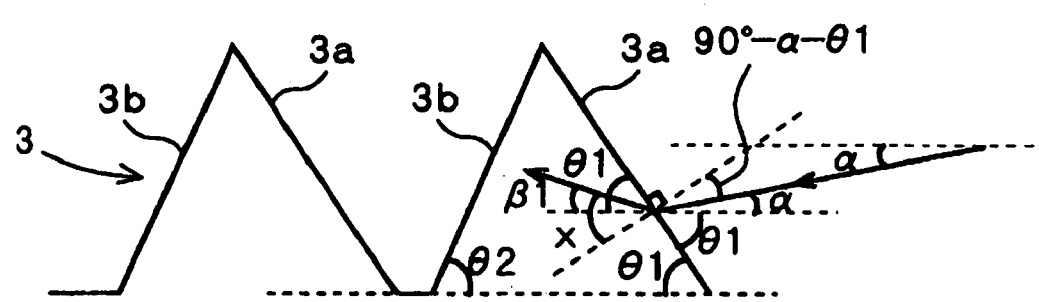
FIG. 15 is a schematic diagram showing light which impinges on and transmits prism plane 3a of a first prism, and travels in an illumination direction.
Figure 16:
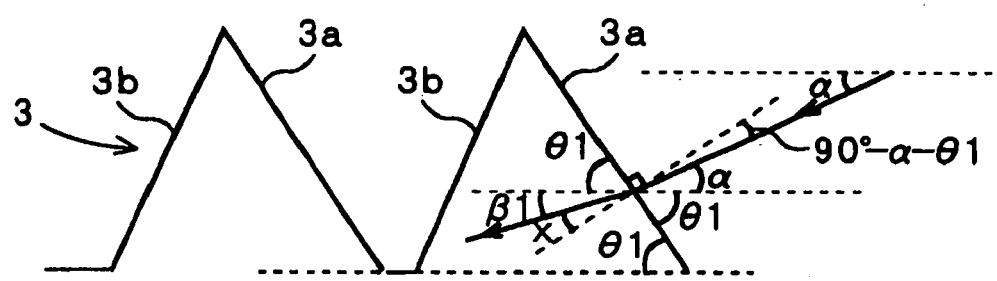
FIG. 16 is a schematic diagram showing light which impinges on and transmits prism plane 3a of a first prism, and travels toward a light source.

Under the condition that the foregoing equation (22) is satisfied for increasing the amount of reflected light from light distributor 2 which is emitted in the illumination direction from the light emission plane of light guide plate 1 through prism section 3, the following two scenarios can be assumed for the propagation of reflected light from light distributor 2 which has transmitted prism plane 3a of the first prism. A first scenario is, as shown in FIG. 15, that light incident on and transmitting prism plane 3a of the first prism travels in the illumination direction. A second scenario is, as shown in FIG. 16, that light incident on and transmitting prism plane 3a of the first prism travels toward the light source.

Conditions are found for the light to travel as in the first scenario shown in FIG. 15.

As the Snell's law is applied to light which transmits prism plane 3a as shown in FIG. 15, equation (23) is derived, and equation (23) may be transformed into equation (24):

$$n0 \times \sin x = n1 \times \sin(90° - \alpha - \theta1) \tag{23}$$

$$x = \sin^{-1}\{n \times \sin(90° - \alpha - \theta1)\} \tag{24}$$

where α represents the angle formed by light incident from light distributor 2 with the light emission plane of light guide plate 1; β1 the angle formed by the light transmitting prism plane 3a with the light emission plane of light guide plate 1; x the angle formed by this transmitted light with a direction perpendicular to prism plane 3a; n0 the refractive index of air; n1 the refractive index of light guide plate 1; and n (=n1/n0) the relative refractive index of light guide plate 1 to air.

In order that the transmitted light travels in the illumination direction, x+θ1>90° should be satisfied. Therefore, equation (25) must be satisfied:

$$\theta1 + \sin^{-1}\{n \times \sin(90° - \alpha - \theta1)\} > 90° \tag{25}$$

Since angle x formed by the transmitted light traveling in the illumination direction with the direction perpendicular to prism plane 3a is expressed by equation (24), angle β1 formed by the transmitted light traveling in the illumination direction as shown in FIG. 15 with the light incident plane of light guide plate 1 is expressed by equation (26):

$$\beta1 = \theta1 + \sin^{-1}\{n \times \sin(90° - \alpha - \theta1)\} - 90° \tag{26}$$

Next, conditions are found for the light to travel as in the second scenario shown in FIG. 16. In the second scenario, light incident to and transmitting prism plane 3a of the first prism travels toward the light source, as shown in FIG. 16.

As the Snell's law is applied to light which transmits prism plane 3a as shown in FIG. 16, equation (27) is derived, and equation (27) may be transformed into equation (28):

$$n0 \times \sin x = n1 \times \sin(90° - \alpha - \theta1) \tag{27}$$

$$x = \sin^{-1}\{n \times \sin(90° - \alpha - \theta1)\} \tag{28}$$

where α represents the angle formed by light incident from light distributor 2 with the light emission plane of light guide plate 1; β1 the angle formed by the light transmitting prism plane 3a with the light emission plane of light guide plate 1; x the angle formed by this transmitted light with a direction perpendicular to prism plane 3a; n0 the refractive index of air; n1 the refractive index of light guide plate 1; and n (=n1/n0) the relative refractive index of light guide plate 1 to air.

In order that the transmitted light travels toward the light source, x+θ1≦90° should be satisfied. Therefore, equation (29) should be satisfied:

$$\theta1 + \sin^{-1}\{n \times \sin(90° - \alpha - \theta1)\} \le 90° \tag{29}$$

Since angle x formed by the transmitted light traveling in the illumination direction with the direction perpendicular to prism plane 3a is expressed by equation (28), angle β1 formed by the transmitted light traveling toward the light source as shown in FIG. 16 with the light incident plane of light guide plate 1 is expressed by equation (30):

$$\beta 1 = 90° - \theta 1 - \sin^{-1}\{n \times \sin(90° - \alpha - \theta 1)\} \tag{30}$$

In the first scenario in which light travels in the illumination direction, when reflected light from light distributor 2 transmits prism section 3, and is finally reflected by prism plane 3a and emitted from light guide plate 1 in the illumination direction, a majority of light can be covered when considering the following situations (1) and (2). In the second scenario in which light travels toward the light source, when reflected light from light distributor 2 transmits prism section 3, and is finally reflected by prism plane 3a and emitted from light guide plate 1 in the illumination direction, a majority of light can be covered when considering the following situations (3) and (4). It should be noted that any of the situations (1)–(4) are contemplated on premises that equation (22) is satisfied.

(1) Light transmitting prism plane 3a of the first prism travels in the illumination direction (satisfying equation (25)), wherein this transmitted light transmits prism plane 3b of the first prism, is reflected by prism plane 3a of the second prism, and is emitted in the illumination direction from light emission plane of light guide plate 1.

(2) Light transmitting prism plane 3a of the first prism travels in the illumination direction (satisfying equation (25)), wherein this transmitted light transmits prism plane 3b of the first prism and prism planes 3a and 3b of the second prism, is reflected by prism plane 3a of the third prism, and is emitted in the illumination direction from light emission plane of light guide plate 1.

(3) Light transmitting prism plane 3a of the first prism travels toward the light source (satisfying equation (29)), wherein the transmitted light transmits prism plane 3b of the first prism and prism planes 3a and 3b of the second prism, is reflected by prism plane 3a of the third prism, and is emitted in the illumination direction from light emission plane of light guide plate 1.

(4) Light transmitting prism plane 3a of the first prism travels toward the light source (satisfying equation (29)), wherein the transmitted light transmits prism plane 3b of the first prism, prism planes 3a and 3b of the second prism, and prism planes 3a and 3b of the third prism, is reflected by prism plane 3a of the fourth prism, and is emitted in the illumination direction from the light emission plane of the light guide plate 1.

Description will now be made on conditions for causing situation (1) to emerge. Specifically, the conditions are those under which light transmitting prism plane 3a of the first prism travels in the illumination direction (satisfying equation (25)), wherein this transmitted light transmits prism plane 3b of the first prism, is reflected by prism plane 3a of the second prism, and is emitted in the illumination direction from light emission plane of light guide plate 1, on the premise that equation (22) is satisfied.

Figure 17:
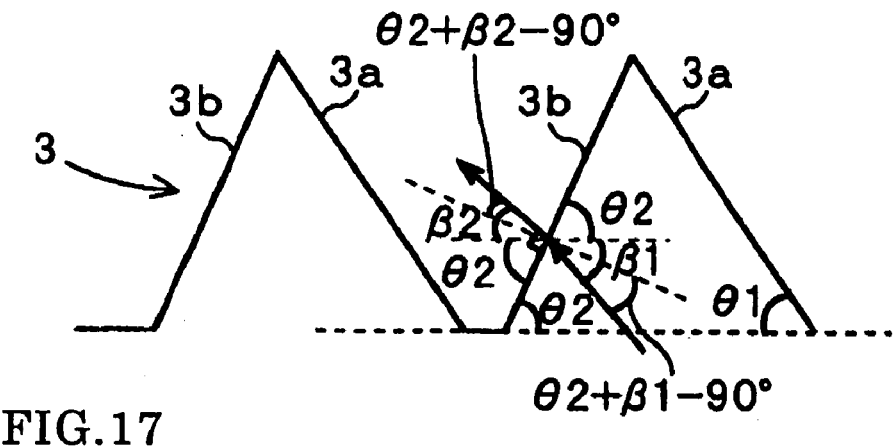
FIG. 17 is a schematic diagram showing transmitted light which travels closer to an emission direction of a light guide plate than to the direction perpendicular to prism plane 3b.
Figure 18:
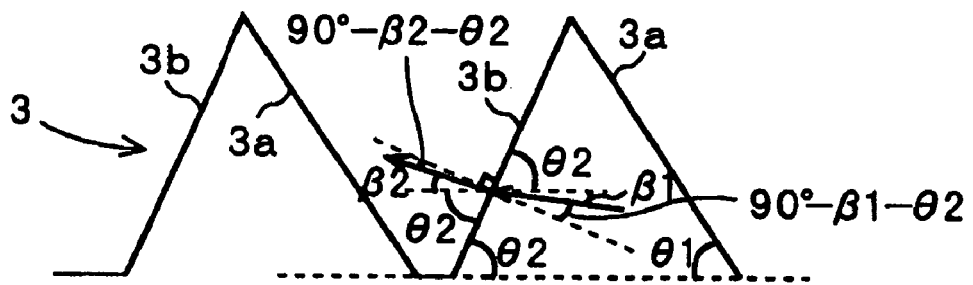
FIG. 18 is a schematic diagram showing transmitted light which travels in a direction further away from an emission direction of a light guide plate than the direction perpendicular to prism plane 3b.

There are two possible scenarios in which reflected light from light distributor 2, which is incident on prism plane 3a of the first prism, transmits prism plane 3a, travels in the illumination direction (FIG. 15, equation (25)), and also transmits prism plane 3b. In one scenario, the transmitted light travels through light guide plate 1 closer to the illumination direction than the direction perpendicular to prism plane 3b, as shown in FIG. 17. In the other scenario, the transmitted light travels through light guide plate 1 in a direction further away from the illumination direction than the direction perpendicular to prism plane 3b, as shown in FIG. 18. In either of the scenarios shown in FIGS. 17 and 18, the transmitted light which has transmitted prism plane 3b forms an angle β2 with the light incident plane of light guide plate 1.

When the light travels as in the first scenario shown in FIG. 17, equation (31) is derived by applying the Snell's law, and equation (31) may be transformed into equation (32):

$$n1 \times \sin(\theta 2 + \beta 2 - 90°) = n0 \times \sin(\theta 2 + \beta 1 - 90°) \tag{31}$$

$$\beta 2 = 90° - \theta 2 + \sin^{-1}\left\{\frac{1}{n} \times \sin(\theta 2 + \beta 1 - 90°)\right\} \tag{32}$$

When the light travels as in the second scenario shown in FIG. 18, equation (33) is derived by applying the Snell's law, and equation (33) may be transformed into equation (34):

$$n1 \times \sin(90° - \beta 2 - \theta 2) = n0 \times \sin(90° - 1 - \theta 2) \tag{33}$$

$$\beta 2 = 90° - \theta 2 - \sin^{-1}\left\{\frac{1}{n} \times \sin(90° - \beta 1 - \theta 2)\right\} \tag{34}$$

It should be noted that since $\sin^{-1}(-x) = -\sin^{-1}x$, equation (32) is equal to equation (34).

In order that light which has transmitted prism plane 3b of the first prism and travels at angle β2 expressed by equation (32) (equation (34)) impinges on prism plane 3a of the second prism, equation (35) must be satisfied:

$$\theta 1 > \beta 2 \tag{35}$$

Figure 19:
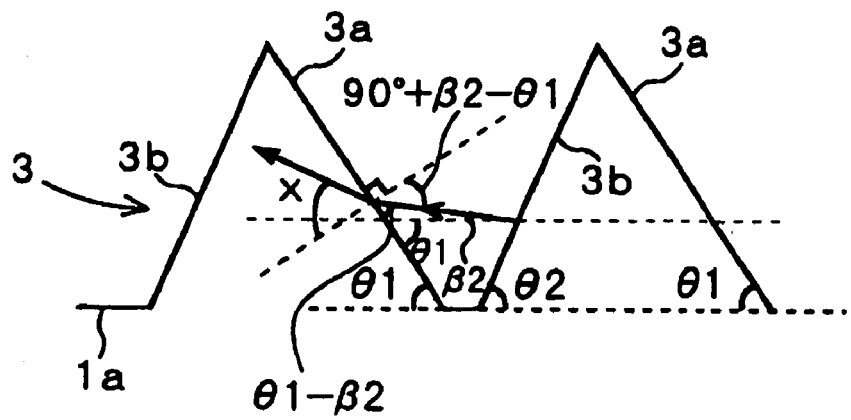
FIG. 19 is a schematic diagram showing a path of light which transmits prism plane 3a of a second prism.

Next, a condition is found in order that light traveling at angle β2 expressed by equation (32) (equation (34)) is reflected by prism plane 3a of the second prism. For this purpose, consider first the case where the light transmits prism plane 3a of the second prism. As shown in FIG. 19, when light traveling at angle β2 to the light incident plane of light guide plate 1 transmits prism plane 3a of the second prism, equation (36) is derived from the Snell's law, and equation (36) may be transformed into equation (37):

$$n1 \times \sin(90° + \beta 2 - \theta 1) = n0 \times \sin x \tag{36}$$

$$\sin(90° + \beta 2 - \theta 1) = \frac{1}{n} \times \sin x \tag{37}$$

where x is the angle of refraction of the transmitted light.

In FIG. 19, angle x of refraction of the transmitted light takes a maximum value of 90°, at which time the incident angle to prism plane 3a (90°+β2−θ1) also takes a maximum value which is expressed by equation (38):

$$90° + \beta 2 - \theta 1 = \sin^{-1}\left(\frac{1}{n}\right) \tag{38}$$

Therefore, the condition under which incident light on prism plane 3a does not transmit but is reflected by prism plane 3a in FIG. 19 is to satisfy equation (39). Equation (39)

may be transformed into equation (40), and equation (41) is derived from equations (35) and (40):

$$90° + \beta 2 - \theta 1 > \sin^{-1}\left(\frac{1}{n}\right) \tag{39}$$

$$\theta 1 - \beta 2 < 90° - \sin^{-1}\left(\frac{1}{n}\right) \tag{40}$$

$$0 < \theta 1 - \beta 2 < 90° - \sin^{-1}\left(\frac{1}{n}\right) \tag{41}$$

Figure 20:
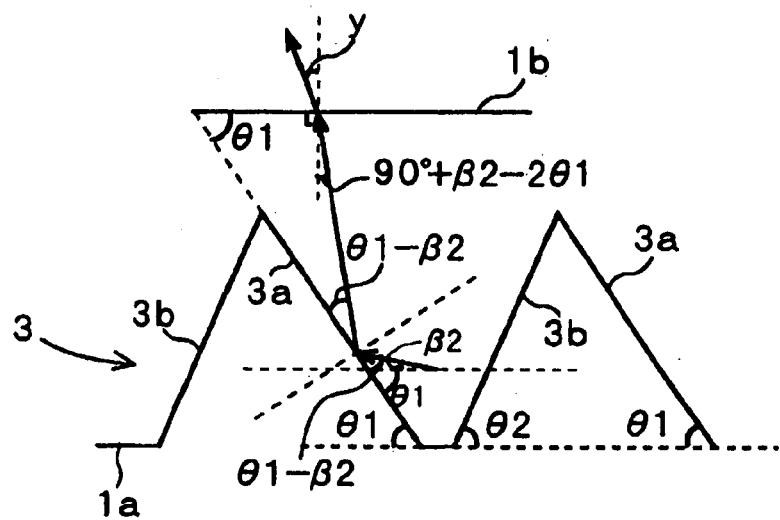
FIG. 20 is a schematic diagram showing a path of light which is reflected by prism plane 3a of a second prism and is emitted from a light guide plate plane on the left side of the direction perpendicular to a light guide plate plane.

Next, a condition is found in order that light reflected by prism plane 3a of the second prism is emitted in the illumination direction from the light emission plane of light guide plate 1. There are two possible scenarios in which light reflected by prism plane 3a of the second prism is emitted in the illumination direction from the light emission plane of light guide plate 1. In one scenario, light is emitted on the left side from the direction perpendicular to the light emission plane of light guide plate 1, as shown in FIG. 20. In the other scenario, light is emitted on the right side from the direction perpendicular to the light emission plane of light guide plate 1.

When light is emitted on the left side from the direction perpendicular to the light emission plane of light guide plate 1 as shown in FIG. 20, the Snell's law can be applied to light emitted in the illumination direction from the light emission plane of light guide plate 1 to derive equation (42):

$$n1 \times \sin(90° + \beta 2 - 2 \times \theta 1) = n0 \times \sin y \tag{42}$$

where y represents the angle formed by light transmitting the light emission plane of light guide plate 1 with the direction perpendicular to the light emission plane of light guide plate 1.

In order to emit light in the illumination direction from light guide plate 1, equation (43) must be satisfied:

$$0 \leq y < 90° \tag{43}$$

The following equation (44) is derived from equations (42) and (43):

$$90° - \sin^{-1}\left(\frac{1}{n}\right) < 2 \times \theta 1 - \beta 2 \leq 90° \tag{44}$$

Figure 21:
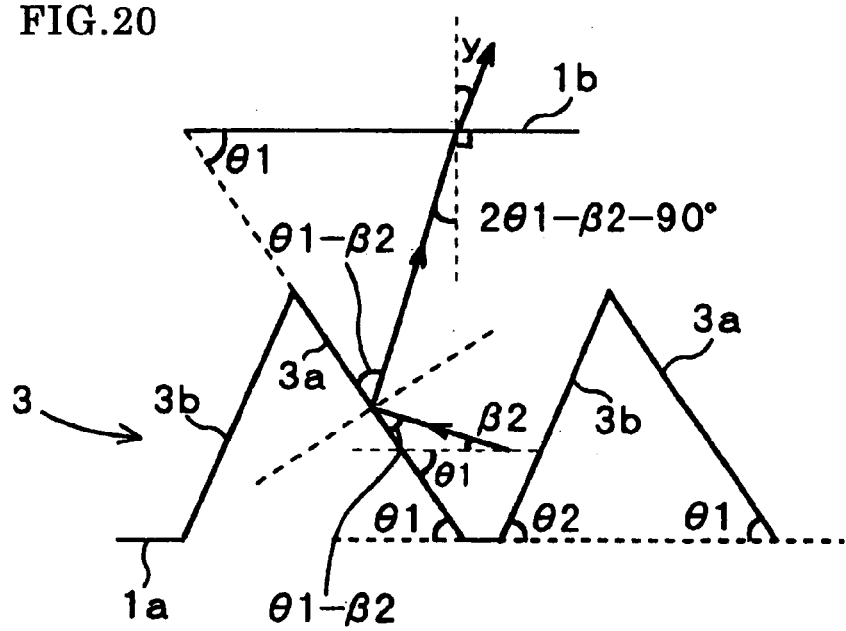
FIG. 21 is a schematic diagram showing a path of light which is reflected by prism plane 3a of a second prism, and is emitted from a light guide plate plane on the right side of the direction perpendicular to a light guide plate plane.

When light is emitted on the right side from the direction perpendicular to the light emission plane of light guide plate 1 as shown in FIG. 21, the Snell's law can be applied to light emitted in the illumination direction from the light emission plane of light guide plate 1 to derive equation (45):

$$n1 \times \sin(2 \times \theta 1 - \beta 2 - 90°) = n0 \times \sin y \tag{45}$$

where y represents the angle formed by light transmitting the light emission plane of light guide plate 1 with the direction perpendicular to the light emission plane of light guide plate 1.

In order to emit light in the illumination direction from the light emission plane of light guide plate 1, equation (46) must be satisfied:

$$0° \leq y < 90° \tag{46}$$

The following equation (47) is derived from equations (45) and (46):

$$90° \leq 2 \times \theta 1 - \beta 2 < 90° + \sin^{-1}\left(\frac{1}{n}\right) \tag{47}$$

Once equation (44) or (47) is satisfied, the light reflected by prism plane 3a of the second prism is emitted in the illumination direction from the light emission plane of light guide plate 1, so that equation (48) must be satisfied in order to emit light incident on and transmitting prism plane 3a of the first prism in the illumination direction from the light emission plane of light guide plate 1 when the transmitted light travels in the illumination direction:

$$90° - \sin^{-1}\left(\frac{1}{n}\right) < 2 \times \theta 1 - \beta 2 \leq 90° + \sin^{-1}\left(\frac{1}{n}\right) \tag{48}$$

From the foregoing, in order to satisfy the conditions which cause the foregoing situation (1) to emerge, i.e., in order that light transmitting prism plane 3a of the first prism travels in the illumination direction (satisfying equation (25)), wherein this transmitted light transmit prism plane 3b of the first prism, is reflected by prism plane 3a of the second prism, and is emitted in the illumination direction from light emission plane of light guide plate 1, on the premise that equation (22) is satisfied, equations (19), (22), (25), (26), (32), (41), and (48) must be satisfied.

Next, description will be made on conditions for causing situation (2) to emerge. Specifically, the conditions are those under which light transmitting prism plane 3a of the first prism travels in the illumination direction (satisfying equation (25)), wherein this transmitted light transmits prism plane 3b of the first prism and prism planes 3a and 3b of the second prism, is reflected by prism plane 3a of the third prism, and is emitted in the illumination direction from light emission plane of light guide plate 1, on the premise that equation (22) is satisfied.

The condition in order that light incident on and transmitting prism plane 3a of the first prism, which travels in the illumination direction (satisfying equation (25)), transmits prism plane 3b of the first prism and prism plane 3a of the second prism is, from equation (38), that light traveling at angle β2 expressed by equation (32) to the light incident plane of light guide plate 1 satisfies equation (49).

$$\theta 1 - \beta 2 > 90° - \sin^{-1}\left(\frac{1}{n}\right) \tag{49}$$

The angle β3 formed by light transmitting prism plane 3a of the second prism with the light incident plane of light guide plate 1 can be expressed by equation (50) using angle x of refraction of the transmitted light, found from equation (36), so that angle β3 is expressed by equation (51) as well:

$$\beta 3 = x + \theta 1 - 90° \tag{50}$$

$$\beta 3 = \theta 1 + \sin^{-1}\{n \times \sin(90° + \beta 2 - \theta 1)\} - 90° \tag{51}$$

When light having angle β3 to the light incident plane of light guide plate 1 is incident on and transmits prism plane 3b of the second prism, resulting light forms an angle β4 with the light emission plane of light guide plate, as expressed by equation (52). This equation (52) can be derived by replacing β2 in equation (32) with β4, replacing β1 in equation (32) with β3, and substituting equation (51) into equation (32).

$$\beta 4 = \sin^{-1}\left[\frac{1}{n}\sin\{\theta 1 + \theta 2 + \sin^{-1}\{n \times \sin(90° + \beta 2 - \theta 1)\} - 180°\}\right] + 90° - \theta 2 \quad (52)$$

In order that this light is incident on prism plane 3a of the third prism and is emitted in the illumination direction from the light emission plane of light guide plate 1, equations (53) and (54) must be satisfied in a process similar to that for deriving equations (41) and (48):

$$0 < \theta 1 - \beta 4 < 90° - \sin^{-1}\left(\frac{1}{n}\right) \quad (53)$$

$$90° - \sin^{-1}\left(\frac{1}{n}\right) < 2 \times \theta 1 - \beta 4 \le 90° + \sin^{-1}\left(\frac{1}{n}\right) \quad (54)$$

From the foregoing, in order to satisfy the conditions which cause the foregoing situation (2) to emerge, i.e., in order that light transmitting prism plane 3a of the first prism travels in the illumination direction (satisfying equation (25)), wherein this transmitted light transmits prism plane 3b of the first prism and prism planes 3a and 3b of the second prism, is reflected by prism plane 3a of the third prism, and is emitted in the illumination direction from light emission plane of light guide plate 1, on the premise that equation (22) is satisfied, equations (19), (22), (25), (26), (32), (52), (53), and (54) must be satisfied.

Next, description will be made on conditions for causing situation (3) to emerge. Specifically, the conditions are those under which light transmitting prism plane 3a of the first prism travels toward the light source (satisfying equation (29)), wherein the transmitted light transmits prism plane 3b of the first prism and prism planes 3a and 3b of the second prism, is reflected by prism plane 3a of the third prism, and is emitted in the illumination direction from light emission plane of light guide plate 1, on the premise that equation (22) is satisfied.

Figure 22:
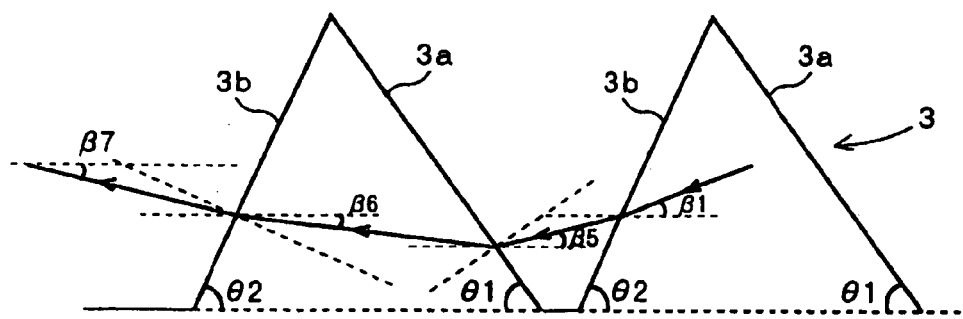
FIG. 22 is a schematic diagram showing a path of light which travels through prism planes 3a and 3b of a first prism and prism planes 3a and 3b of a second prism.

When light incident on and transmitting prism plane 3a of the first prism travels toward the light source (FIG. 16), the angle β1 formed by this light with the light incident plane of light guide plate 1 is expressed by the equation (30). In order to help this transmitted light to be more readily incident on prism plane 3b of the first prism, and in order to permit a more number of prisms to be arranged in prism section 3, the angle formed by prism plane 3b with the light incident plane of light guide plate 1 is preferably closest possible to 90°. In this event, since light does not largely change the direction when it transmits and is refracted on prism plane 3b, the light transmitting prism plane 3b more often travels toward the light source when it is refracted on prism plane 3b, as shown in FIG. 22. When light travels as shown in FIG. 22, angle β5 formed by the direction in which the transmitted light travels with the light incident plane of light guide plate 1 can be found by equation (55) using the Snell's law:

$$\beta 5 = \theta 2 + \sin^{-1}\left\{\frac{1}{n} \times \sin(90° + \beta 1 - \theta 2)\right\} - 90° \quad (55)$$

Since angel β5 is smaller than angle α formed by light incident on prism plane 3a of the first prism with the light incident plane of light guide plate 1, equation 56 tends to be satisfied:

$$\theta 1 + \sin^{-1}\{n \times \sin(90° - \beta 5 - \theta 1)\} > 90° \quad (56)$$

The foregoing equation (56) can be derived when β5 is substituted for α in equation (25) which is a conditional equation in order that light transmitting prism plane 3a of the first prism travels in the illumination direction. Assuming that equation (56) is satisfied, if light which forms angle β5 with the light incident plane of light guide plate 1 is incident on and transmits prism plane 3a of the second prism, this transmitted light travels in the illumination direction, so that the light can be handled in a manner similar to the aforementioned situations (1) and (2). Thus, as shown in FIG. 22, angle β6 formed by light transmitting prism plane 3a of the second prism with the light incident plane of light guide plate 1, and angle β7 formed by light transmitting prism plane 3b of the second prism with the light incident plane of light guide plate 1 can be found by equations (57) and (58), respectively:

$$\beta 6 = \theta 1 + \sin^{-1}\{n \times \sin(90° - \beta 5 - \theta 1)\} - 90° \quad (57)$$

$$\beta 7 = 90° - \theta 2 + \sin^{-1}\left\{\frac{1}{n} \times \sin(\theta 2 + \beta 6 - 90°)\right\} \quad (58)$$

In order that light having angle β7 with the light incident plane of light guide plate 1 is incident on prism plane 3a of the third prism, reflected by prism plane 3a of the third prism, and emitted in the illumination direction from the light emission plane of light guide plate 1, equations (59) and (60) must be satisfied in a process similar to that for deriving equations (41) and (48):

$$0 < \theta 1 - \beta 7 < 90° - \sin^{-1}\left(\frac{1}{n}\right) \quad (59)$$

$$90° - \sin^{-1}\left(\frac{1}{n}\right) < 2 \times \theta 1 - \beta 7 \le 90° + \sin^{-1}\left(\frac{1}{n}\right) \quad (60)$$

From the foregoing, in order to satisfy the conditions which cause the foregoing situation (3) to emerge, i.e., in order that light transmitting prism plane 3a of the first prism travels toward the light source (satisfying equation (29)), wherein the transmitted light transmits prism plane 3b of the first prism and prism planes 3a and 3b of the second prism, is reflected by prism plane 3a of the third prism, and is emitted in the illumination direction from light emission plane of light guide plate 1, on the premise that equation (22) is satisfied, equations (19), (22), (29), (30), (55), (57), (58), (59), and (60) must be satisfied.

Next, description will be made on conditions for causing situation (4) to emerge. Specifically, the conditions are those under which light transmitting prism plane 3a of the first prism travels toward the light source (satisfying equation (29)), wherein the transmitted light transmits prism plane 3b of the first prism, prism planes 3a and 3b of the second prism, and prism planes 3a and 3b of the third prism, is reflected by prism plane 3a of the fourth prism, and is emitted in the illumination direction from the light emission plane of the light guide plate 1, on the premise that equation (22) is satisfied.

The conditions for the foregoing are to satisfy equations (61) to (63) which are derived by replacing β2 with β7 (equation (58)), and replacing β4 with angle β9 which is formed by light transmitting prism plane 3b of the third prism and the light incident plane of light guide plate 1 in equations (52) to (54) in the conditions for the aforementioned situation (2) to emerge, on the premise that equations (22), (29), (30) are satisfied:

$$\beta 9 = \sin^{-1}\left[\frac{1}{n}\sin\{\theta 1 + \theta 2 + \sin^{-1}\{n \times \sin(90° + \beta 7 - \theta 1)\} - 180°\}\right] + 90° - \theta 2 \quad (61)$$

$$0 < \theta 1 - \beta 9 < 90° - \sin^{-1}\left(\frac{1}{n}\right) \quad (62)$$

$$90° - \sin^{-1}\left(\frac{1}{n}\right) < 2 \times \theta 1 - \beta 9 \leq 90° + \sin^{-1}\left(\frac{1}{n}\right) \quad (63)$$

It should be noted that β6 (equation (57)), β5 (equation (55)), and β1 (equation (30)) are required for expressing β7 with θ1 and θ2.

From the foregoing, in order to satisfy the conditions which cause the foregoing situation (4) to emerge, i.e., in order that light transmitting prism plane 3a of the first prism travels toward the light source (satisfying equation (29)), wherein the transmitted light transmits prism plane 3b of the first prism, prism planes 3a and 3b of the second prism, and prism planes 3a and 3b of the third prism, is reflected by prism plane 3a of the fourth prism, and is emitted in the illumination direction from the light emission plane of the light guide plate 1, on the premise that equation (22) is satisfied, equations (19), (22), (29), (30), (55), (57), (58), (61), (62), and (63) must be satisfied.

Next, consider the angle of the reflection plane of light distributor 2 disposed on the side of light emission plane of light guide plate 1.

Light distributor 2 requires a plane for reflecting part of light from light source 4 in a direction opposite to the illumination direction. For reflecting light in the direction opposite to the illumination direction, the light may be reflected by one plane or by two planes.

Figure 23:
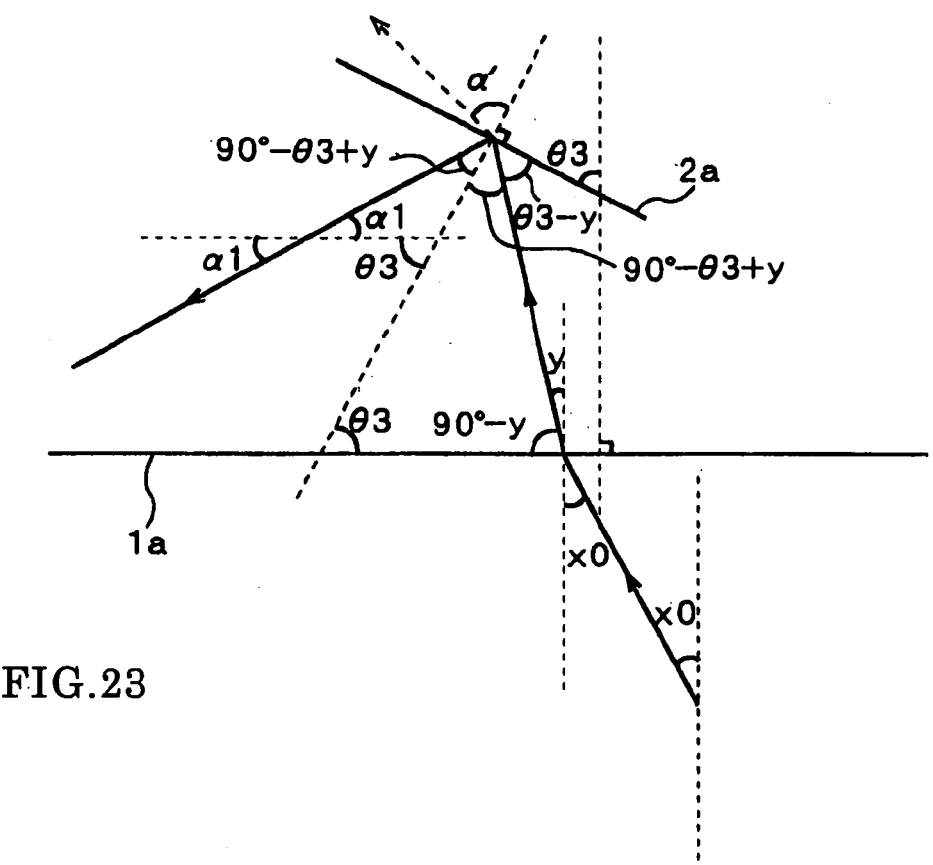
FIG. 23 is a schematic diagram showing a path of light which is reflected by one surface of a light distributor in a direction opposite to an illumination direction.

Consider first a scenario in which light is reflected by one plane of light distributor 2. As shown in FIG. 23, an incident angle of light incident on light guide plate 1 from light source 4 is designated by x0; an angle of refraction by y; the refractive index of air by n0; the refractive index of light guide plate 1 by n1; and the relative refractive index of light guide plate 1 to air by n. The following equation (64) is derived by applying the Snell's law to light incident on light guide plate 1 from light source 4, and equation (64) may be transformed into equation (65) for finding angle of refraction y:

$$n1 \times \sin y = n0 \times \sin x0 \quad (64)$$

$$y = \sin^{-1}\left(\frac{1}{n}\sin \times 0\right) \quad (65)$$

For finding a condition under which light traveling within light guide plate 1 at the angle of refraction expressed by equation (65) is reflected by a plane which forms angle θ3 with the direction perpendicular to the light emission plane of light guide plate 1 (hereinafter referred to as "θ3 plane"), consider first a scenario in which the light is not reflected but transmits the θ3 plane with an angle of refraction designated by α'. From the Snell's law, equation (66) is derived:

$$n0 \times \sin \alpha' = n1 \times \sin(90° - \theta 3 + y) \quad (66)$$

Alpha' has a maximum value equal to 90° when light is not reflected by but transmits the θ3 plane, and in this event, equation (66) reduces to equation (67):

$$\theta 3 - y = 90° - \sin^{-1}\left(\frac{1}{n}\right) \quad (67)$$

Thus, from equations (65) and (67), the condition under which light traveling within light guide plate 1 at the angle of refraction expressed by equation (65) is reflected by a plane which forms angle θ3 with the direction perpendicular to the light emission plane of light guide plate 1 is expressed by equation (68):

$$\theta 3 - \sin^{-1}\left(\frac{1}{n}\sin \times 0\right) < 90° - \sin^{-1}\left(\frac{1}{n}\right) \quad (68)$$

Assuming that light reflected by the θ3 plane travels in the direction opposite to the illumination direction on the condition that the foregoing equation (68) is satisfied, when the light forms an angle α1 with the light incident plane of light guide plate 1, equation (69) is derived from the geometrical relationship about each angle of a direction in which light travels shown in FIG. 23, and equation (70) is derived by solving equation (69) for α1.

$$90° - \theta 3 + y + \alpha 1 = \theta 3 \quad (69)$$

$$\alpha 1 = 2 \times \theta 3 - y - 90° \quad (70)$$

In order that light travels after it was reflected by the θ3 plane in the direction opposite to the illumination direction, equation (71) must be satisfied:

$$\alpha 1 > 0° \quad (71)$$

From equations (65), (70), and (71), in order that the light travels after it was reflected by the θ3 plane in the direction opposite to the illumination direction, equation (72) must be satisfied:

$$2 \times \theta 3 - \sin^{-1}\left(\frac{1}{n}\sin \times 0\right) > 90° \quad (72)$$

Further, as described above, angle θ3 of the reflection plane of light distributor 2 is preferably set such that a largest possible amount of light satisfies the equation (19), and equation (73), derived from equations (19), (65), and (70), should be preferably satisfied:

$$\tan^{-1}\left(\frac{d}{s}\right) < 2 \times \theta 3 - \sin^{-1}\left(\frac{1}{n}\sin \times 0\right) - 90° \quad (73)$$

Furthermore, as described above, angle θ3 of the reflection plane of light distributor 2 is preferably set such that a largest possible amount of reflected light satisfies equation (20), and equation (74), derived from equations (20), (65), and (70), should be preferably satisfied:

$$\tan^{-1}\left(\frac{2 \times d}{s}\right) \leq 2 \times \theta 3 - \sin^{-1}\left(\frac{1}{n}\sin \times 0\right) - 90° \leq \tan^{-1}\left(\frac{4 \times d}{s}\right) \quad (74)$$

Next, consider a scenario in which light from the light source is reflected by two planes of light distributor 2 in the direction opposite to the illumination direction.

Figure 24:
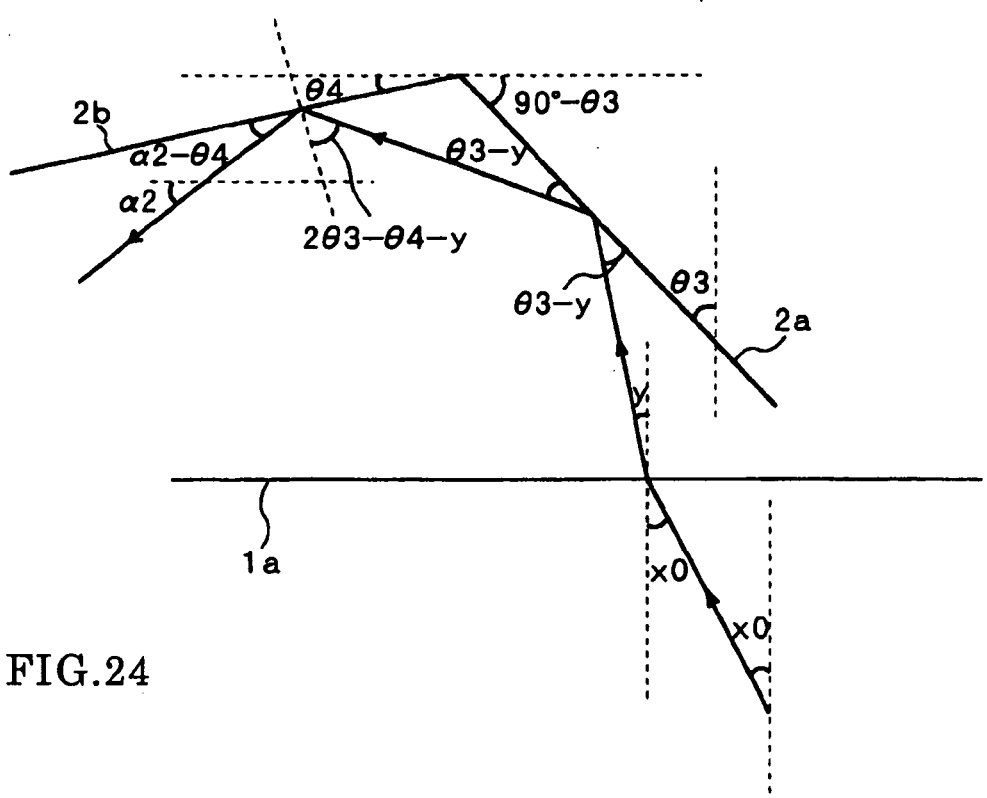
FIG. 24 is a schematic diagram showing a path of light which is reflected by two surfaces of a light distributor in the direction opposite to an illumination direction.

As shown in FIG. 24, two reflection planes of light distributor 2 comprises a plane which forms angle θ3 with the direction perpendicular to the light emission plane of light guide plate 1 (hereinafter referred to as the "θ3 plane"), and a plane which forms angle θ4 with the light emission plane of light guide plate 1 (hereinafter referred to as the "θ4 plane"). Light from light source 4 is incident on light guide plate 1 at incident angle x0, and the light which has transmitted light guide plate 1 has angle y of refraction. Since equation (68) must be satisfied in order that the light is reflected by the θ3 plane, equation (68) must be satisfied in order that the light is reflected by both the θ3 plane and θ4 plane. As shown in FIG. 24, light reflected by the θ3 plane is incident on the θ4 plane at an incident angle calculated by 2×θ3−θ4−y, so that equation (75) must be satisfied in order that this light is reflected by the θ4 plane:

$$2 \times \theta 3 - \theta 4 - y > \sin^{-1}\left(\frac{1}{n}\right) \quad (75)$$

Equation (65) is substituted into equation (75) to derive equation (76) which represents the condition under which light reflected by the θ3 plane is also reflected by the θ4 plane:

$$2 \times \theta 3 - \theta 4 - \sin^{-1}\left(\frac{1}{n}\sin \times 0\right) > \sin^{-1}\left(\frac{1}{n}\right) \quad (76)$$

Assuming that the light reflected by the θ4 plane forms angle α2 with the light emission plane of light guide plate 1, equation (77) is derived from the geometrical relationship about each angle of a direction in which light travels, shown in FIG. 24, and equation (77) is solved for α2 to derive equation (78):

$$\alpha 2 - \theta 4 + \theta 3 - y = \theta 4 + 90° - \theta 3 \quad (77)$$

$$\alpha 2 = 90° - 2 \times \theta 3 + 2 \times \theta 4 + y \quad (78)$$

As mentioned above, the angle of the reflection plane of light distributor 2 is preferably set such that a largest possible amount of light reflected from light distributor 2 satisfies equation (19), equation (79) derived from equations (19), (65), and (78) should be preferably satisfied:

$$\tan^{-1}\left(\frac{d}{s}\right) < 90° - 2 \times \theta 3 + 2 \times \theta 4 + \sin^{-1}\left(\frac{1}{n}\sin \times 0\right) \quad (79)$$

Furthermore, as mentioned above, angles θ3 and θ4 of the reflection plane of light distributor 2 are preferably set such that a largest possible amount of reflected light satisfies equation (20), equation (80) derived from equations (20), (65), and (78) should be preferably satisfied:

$$\tan^{-1}\left(\frac{2 \times d}{s}\right) \leq 90° - 2 \times \theta 3 + 2 \times \theta 4 + \sin^{-1}\left(\frac{1}{n}\sin x0\right) \leq \tan^{-1}\left(\frac{4 \times d}{s}\right) \quad (80)$$

Figure 25:
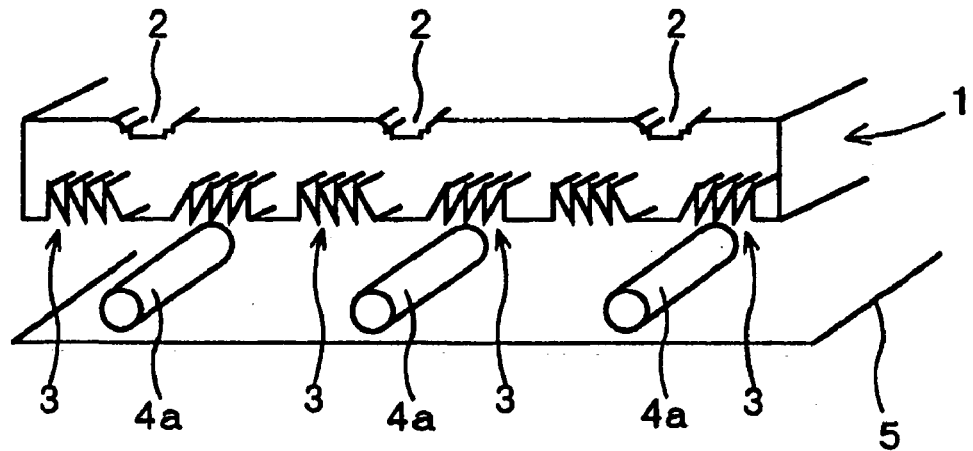
FIG. 25 is a schematic diagram of an illumination device according to an embodiment of the present invention.
Figure 26:
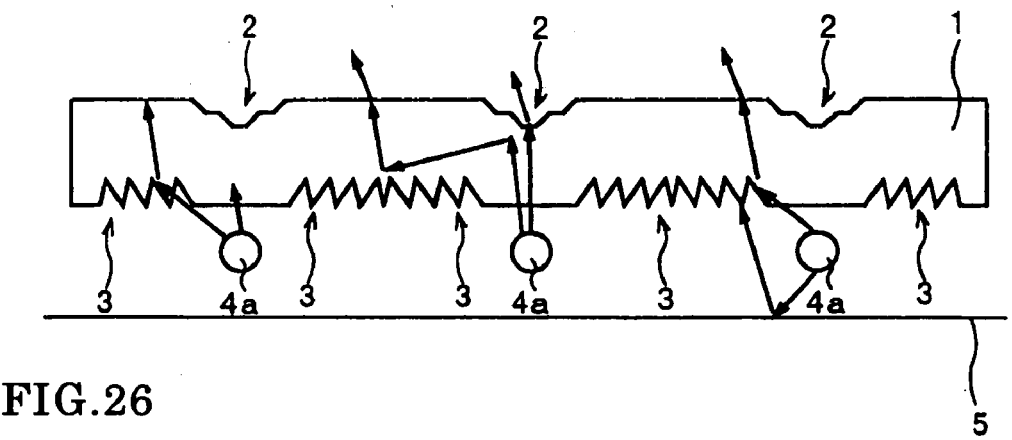
FIG. 26 is a schematic cross-sectional view of an illumination device according to an embodiment of the present invention.
Figure 27:
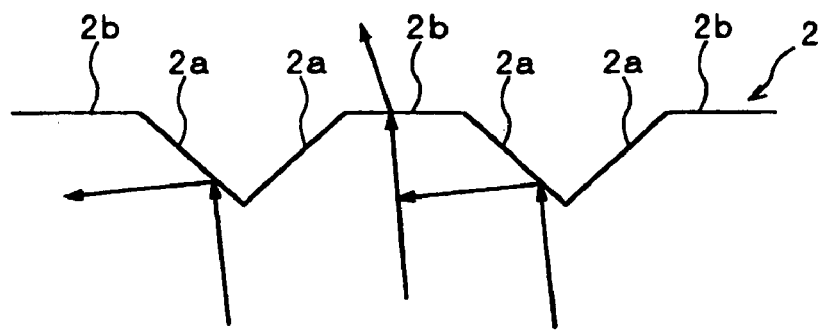
FIG. 27 is a partial schematic diagram of a light distributor.

FIG. 25 is a schematic diagram of an illumination device according to a first embodiment of the present invention, and FIG. 26 is a cross-sectional view of the illumination device. Light emitted from linear light sources 4a is incident on light guide plate 1. Light distributors 2 are disposed at locations substantially above respective light sources 4a, where strong light is emitted from linear light sources 4a. As shown in FIG. 27, part of light incident on light distributors 2 from linear light sources 4a transmits light distributors 2, and exits in the illumination direction of the illumination device, while part of the light is reflected in the direction opposite to the illumination direction. In order to reflect the part of light from light sources 4a in the direction opposite to the illumination direction, light distributors 2 must include planes which satisfy condition 1 (equations (3), (4), (68), and (73)) or condition 2 (equation (3), (4), (68), (75), and (78)).

Figure 28:
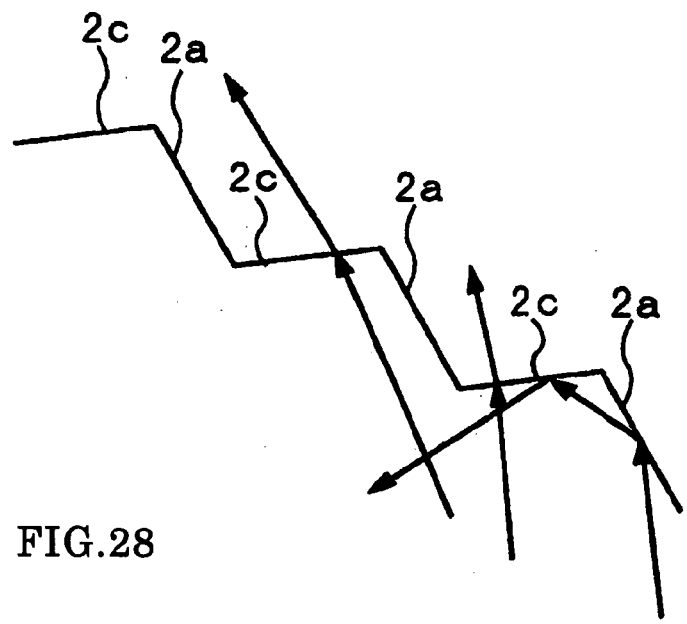
FIG. 28 is a schematic diagram showing a step structure of a light distributor.
Figure 29:
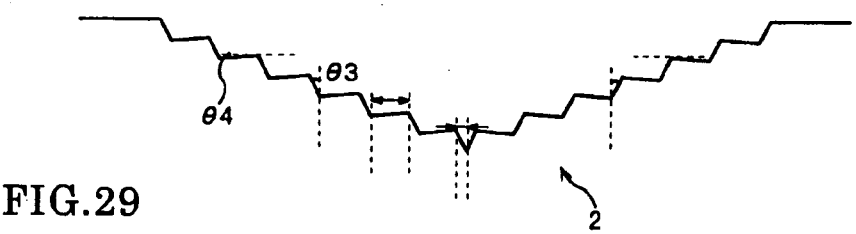
FIG. 29 is an entire schematic diagram showing a light distributor having a step structure.

Such light distributor 2 preferably comprises a plane which reflects light in the direction opposite to the illumination direction and a plane which transmits light (plane which does not satisfy condition 1 or 2) in an alternating sequence, as shown in FIG. 27, because such light distributor 2 helps control the angle and amount of light reflected from light distributor 2. For example, with light distributor 2 (FIG. 29) which has a combination of step structures as shown in FIG. 28, the angle of light reflected from light distributor 2 can be controlled by adjusting θ3 and θ4. The ratio of reflected light to transmitted light can be adjusted as well by adjusting the length of a plane which is substantially flat with respect to the light emission plane of light guide plate 1 and the length of a plane having a steep angle to the light emission plane of light guide plate 1. Further, since light from light sources has the lowest intensity near the midpoint between two adjacent light sources, reflection angle a of light reflected from light distributors 2 is preferably set to satisfy equation (20) such that the light reflected from light distributors 2 tends to concentrate near the midpoint between light sources.

Figure 30:
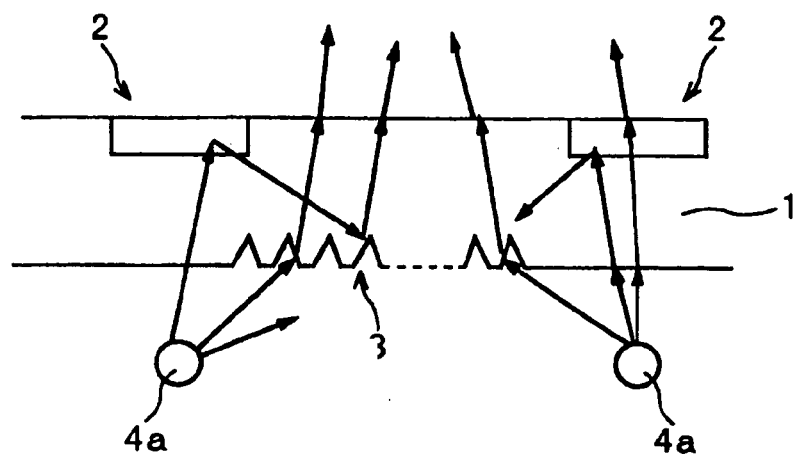
FIG. 30 is a diagram schematically representing two functions of a prism section of a light guide plate.

As shown in FIG. 30, prism section 3 in light guide plate 1 has a function of emitting light reflected from light distributors 2 in the illumination direction, and a function of efficiently emitting light incident on light guide plate 1 directly from light sources 4a between light sources 4a in the illumination direction. Prism section 3 which has the function of emitting light reflected from light distributors 2 in the illumination direction satisfies either conditions 3 (equations (19), (22), (25), (26), (32), (41), and (48)), or conditions 4 (equation (19), (22), (25), (26), (32), (52), (53), and (54)), or conditions 5 (equations (19), (22), (29), (30), (55), (57), (58), (59), and (60)), or conditions 6 (equations (19), (22), (29), (30), (55), (57), (58), (61), (62), and (63)). Prism section 3 which has the function of efficiently emitting light incident on light guide plate 1 directly from light sources 4a between light sources 4a satisfies conditions 7 (equations (7), (14), (6) (when x0≦θ2), (16) (when x0>θ2), and (17)).

Also, since light from light sources 4a has the lowest intensity near the midpoint between adjacent light sources as mentioned above, the angles of two prism planes of prism section 3 are preferably set to satisfy any of the aforementioned conditions 3 to 6 for incident light from light sources 4a which has incident angle x0 that satisfies equation (18). In addition, prism section 3 is preferably bilaterally symmetric about the midpoint between light sources 4a from a viewpoint of the uniformization of emitted light.

The angle of light incident on prism section 3 from light distributors 2 to the light incident plane of light guide plate 1, and the angle of light incident on prism section 3 directly from light sources 4a to the light incident plane of light guide plate 1 vary depending on the location at which prism section 3 is arranged. Therefore, angles θ1, θ2 of two prism planes of prism section 3, and angles θ3, θ4 of the reflection plane of light distributors 2 may be appropriately set to further improve the efficiency and uniformity of emitted light.

The foregoing calculation-based discussion on the angles of prism planes 3a, 3b to the light incident plane of light guide plate 1, and the angle of the reflection plane of light distributor 2 has been made on an arbitrary cross section orthogonal to the light incident plane and light emission plane of light guide plate 1, so that the foregoing discussion can apply to point light sources, not limited to linear light sources which extend in a direction parallel with the light emission plane of light guide plate 1.

Light guide plate 1 associated with the illumination device according to the embodiment of the present invention may be made of resin (acrylic resin or the like), glass, and the like. When light guide plate 1 is made of resin, light guide plate 1 can be fabricated through injection molding. Alternatively, light guide plate 1 can be fabricated by making a light guide plate having light distributor 2 and a light guide plate having prism section 3 through thermal pressing or injection molding, then adhering both with an adhesive.

Light sources used herein may be cold cathode fluorescent lamps, LEDs (light emitting diode) or the like. Alternatively, point light sources such as shell-shaped LEDs, surface-mountable LEDs, and the like may be linearly arranged at intervals for use as linear light sources.

Figure 31:
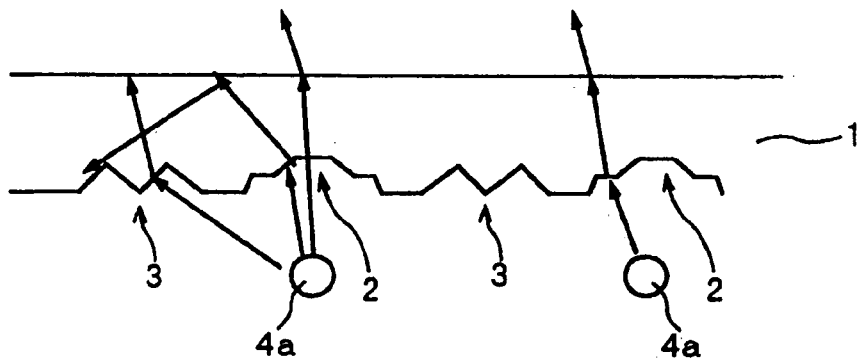
FIG. 31 is a schematic cross-sectional view of a light guide plate when a light distributor is arranged on a light incident plane.

Next, description will be made on an illumination device according to a second embodiment. FIG. 31 is a schematic cross-sectional view of the illumination device according to the second embodiment. As shown in FIG. 31, light distributors 2 are disposed on the light incident plane of light guide plate 1 at locations substantially above light sources 4, where relatively strong light is emitted, and prism sections 3 are arranged on the light incident plane of light guide plate 1. Each of light distributors 2 causes part of light emitted from associated light source 4 to exit from light guide plate 1 as it is, and refracts at least part of the remaining light to be reflected by the light emission plane of light guide plate 1. Prism sections 3 refract and reflect light reflected by the light emission plane of light guide plate 1 and incident on prism sections 3, and light incident on prism sections 3 directly from light sources 4 to guide at least part of such light to the light emission plane of light guide plate 1.

Next, description will be made on the operation of the illumination device according to the second embodiment. Light emitted from light sources 4 and incident on light distributors 2 in light guide plate 1 partially exits from light guide plate 1 as it is, and the remaining light is predominantly refracted by light distributors 2 and travels within light guide plate 1. Then, the light is reflected by the light emission plane of light guide plate 1 if the incident angle at which the light is incident on the light emission plane of light guide plate 1 is larger than the critical angle. Light reflected by the light emission plane of light guide plate 1 and incident on prism sections 3, and light incident on prism sections 3 directly from light sources 4 are refracted and reflected by prism sections 3, and is emitted mainly in regions away from light sources 4 in which light distributors 2 are not disposed, mainly in a direction perpendicular to the light emission plane of light guide plate 1 and opposite to light sources 4.

The second embodiment provides advantages similar to those of the first embodiment. Specifically, strong emitted light at locations substantially above light sources 4 is distributed by light distributors 2 to the regions of light guide plate 1 away from light sources 4, such as between light sources 4, so that the light is emitted in the illumination direction by prism sections 3 in the regions away from light sources 4 in which no light distributors 2 are disposed, thereby making it possible to emit light in a uniform distribution.

To achieve the foregoing advantage, the angles of prism planes of prism sections 3 in light guide plate 1 must be set such that light which is refracted through light distributor 2, reflects on the light emission plane of light guide plate 1, and is incident on prism sections 3 is efficiently emitted in the illumination direction from the light emission plane of light guide plate 1. The angles of other prism planes of prism sections 3 in light guide plate 1 also must be set such that light directly incident on prism sections 3 in light guide plate 1 away from light sources 4 is efficiently emitted in the illumination direction from the light emission plane of light guide plate 1. The angels of these prism planes of prism sections 3 are set in a manner similar to the settings described in the first embodiment.

Required width P of light distributor 2 in the direction parallel with the light emission plane of light distributor 2, when light distributor 2 is disposed on the light incident plane of light guide plate 1, is calculated with reference to FIG. 3 as is the case with light distributor 2 disposed on the light emission plane of light guide plate 1. When light distributor 2 is disposed on the light emission plane of light guide plate 1, required width P of light distributor 2 is calculated by equation (81) because thickness d of light guide plate 1 need not be taken into consideration:

$$P < \frac{2r}{\tan\left\{90° - \sin^{-1}\left(\frac{1}{n}\right)\right\}} + D \tag{81}$$

A region which receives a larger amount of light emitted from light sources 4 has a width at least larger than that of light sources 4, so that when light distributor 2 is disposed on the light incident plane of light guide plate 1, required width P of light distributor 2 is calculated by equation (82):

$$D \leq P < \frac{2r}{\tan\left\{90° - \sin^{-1}\left(\frac{1}{n}\right)\right\}} + D \quad (82)$$

In light guide plate 1 which has light distributor 2 disposed on the light incident plane thereof, since light distributor 2 and prism section 3 are disposed on the same plane, the formation of structures is needed only on one plane of light guide plate 1, thus advantageously facilitating the manufacturing.

EXAMPLE 1

Figure 32:
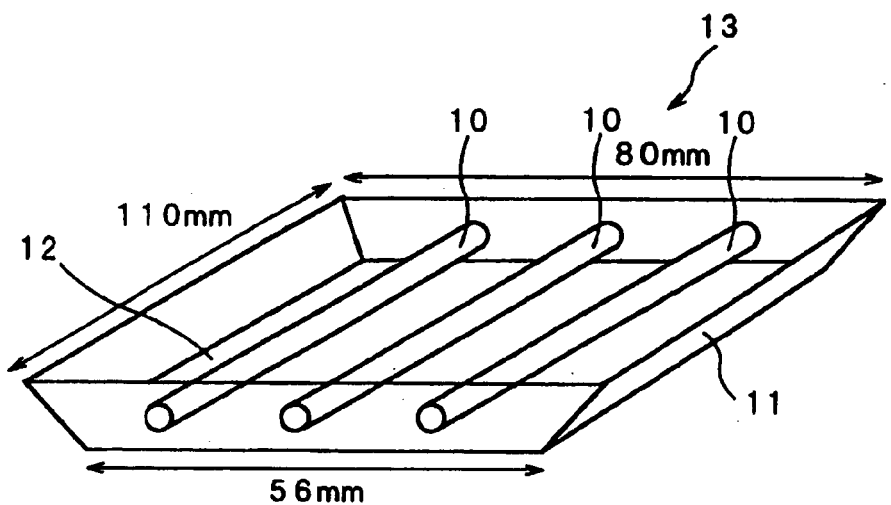
FIG. 32 is a perspective view generally illustrating a fabricated light source unit.
Figure 33:
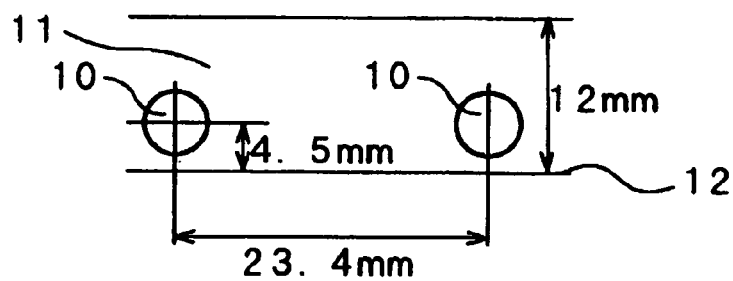
FIG. 33 is a partial cross-sectional view of a fabricated light source unit.
Figure 34:
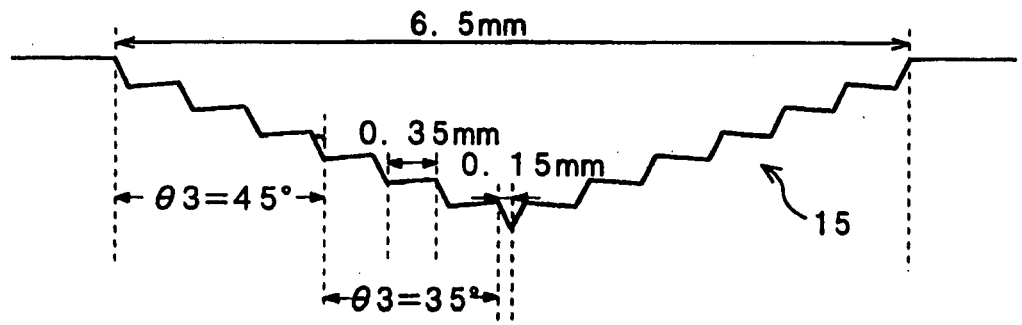
FIG. 34 is a cross-sectional view of a whole light distributor of a fabricated light guide plate.
Figure 35:
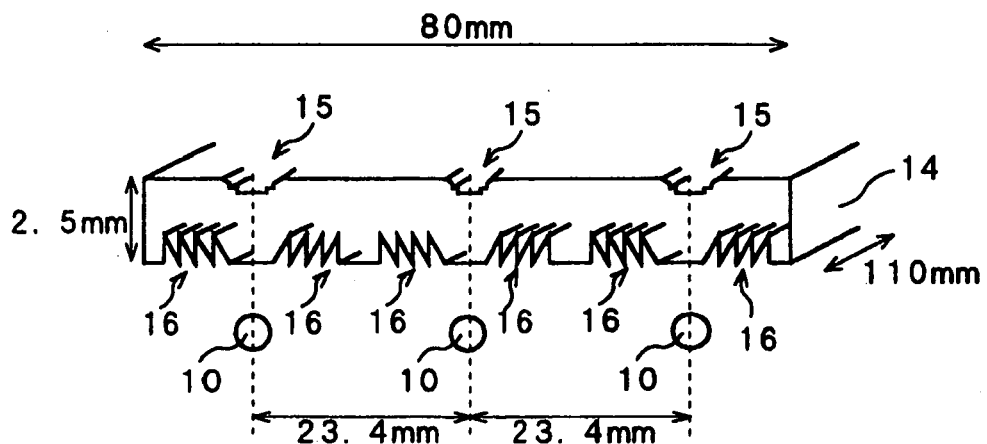
FIG. 35 is a diagram schematically showing the positional relationship among cold cathode fluorescent lamps, a light distributor of a light guide plate, and a prism section of a light guide plate in a fabricated illumination device.
Figure 36:
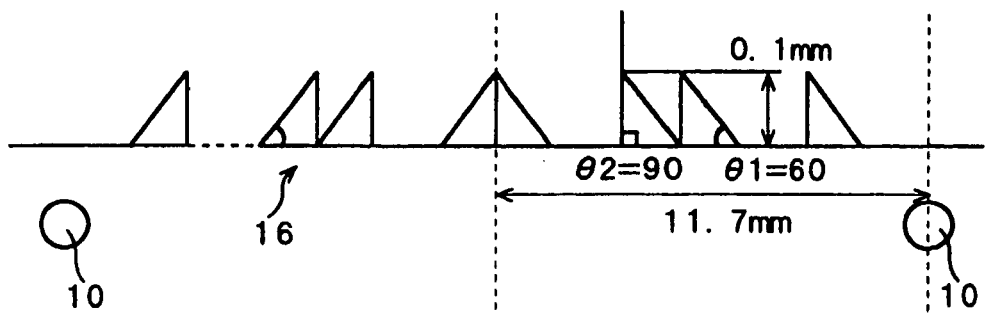
FIG. 36 is a diagram schematically showing how a prism section of a light guide plate is arranged in a fabricated illumination device.
Figure 37:
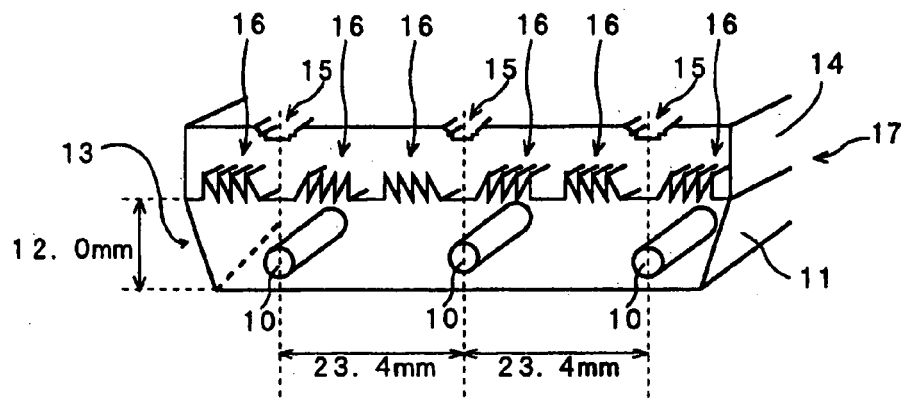
FIG. 37 is a schematic diagram generally illustrating a fabricated illumination device.

FIG. 32 generally illustrates a fabricated light source unit, and FIG. 33 is a partial cross-sectional view of the fabricated light source unit. Three cold cathode fluorescent lamps 10 having a diameter of 3 mm were arranged at intervals of 23.4 mm within housing 1 with reflective sheet 12 adhered on the inner wall thereof, thus fabricating light source unit 13. Light guide plate 14 had a width of 80 mm, a length of 110 mm, and a thickness of 2.5 mm. Light distributors 15 each included steps with θ3=35° or 45° and θ4=0°, and were arranged at intervals of 23.4 mm, equal to the intervals at which cold cathode fluorescent lamps 10 were arranged, as shown in FIG. 35. As shown in FIG. 36, prism sections 16 in light guide plate 14 had θ1=60° and θ2=90°, and had prism planes which were designed to be bilaterally symmetric about the center of raw of cold cathode fluorescent lamps 10. Light guide plate 14 was made of acrylic resin, and was fabricated by separately making a light guide plate having light distributors 15 and a light guide plate having prism sections 16 by thermal pressing, then adhering both with an adhesive which had the same refractive index (n=1.5) as light guide plate 14.

Light guide plate 14 was disposed on light source unit 13 to fabricate illumination device 17, which was tested to find a light emission distribution and a light emission angle distribution.

Figure 38:
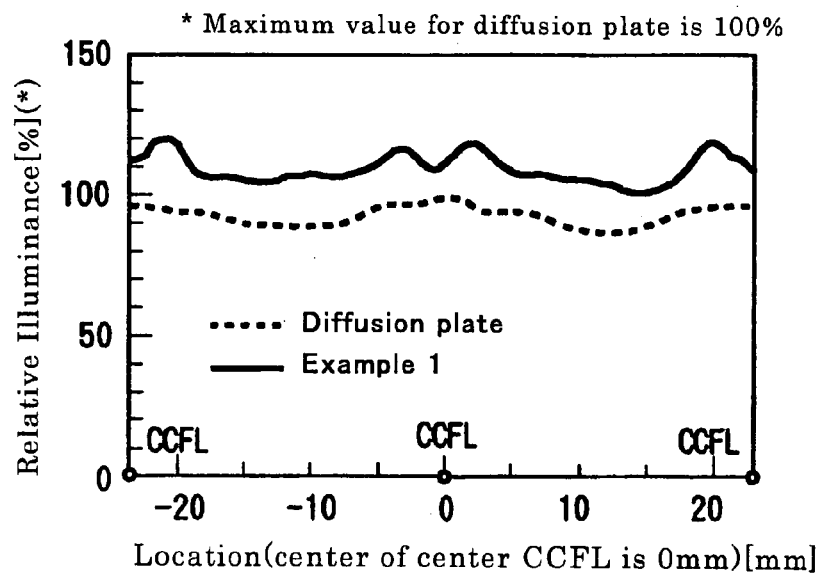
FIG. 38 is a graph showing the result of a measurement made on a light emission distribution in Example 1.
Figure 39:
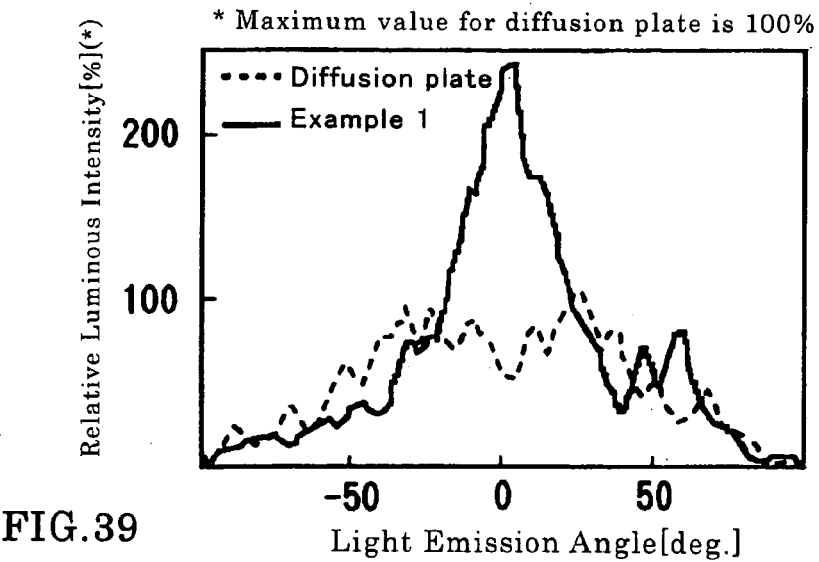
FIG. 39 is a graph showing the result of a measurement made on a light emission angle distribution in Example 1.
Figure 40:
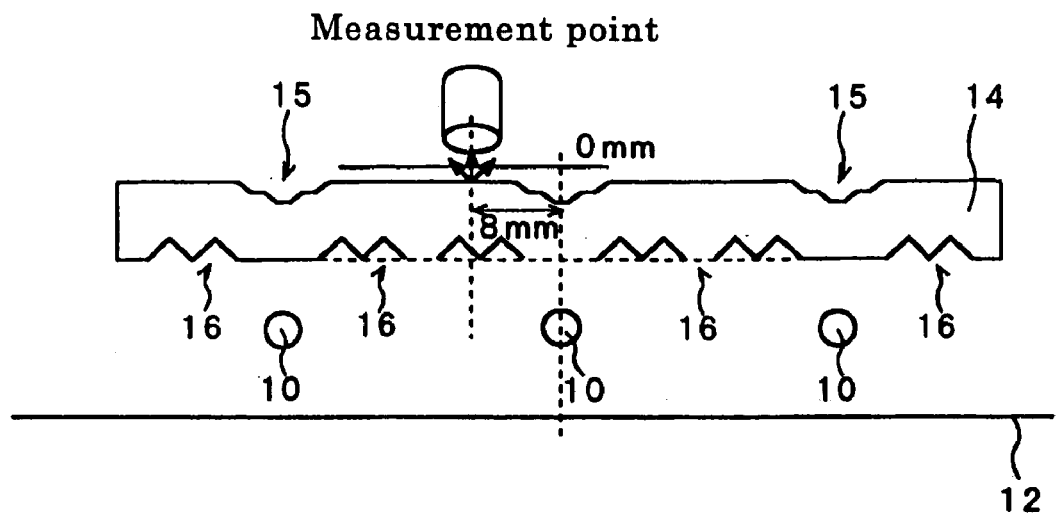
FIG. 40 is a schematic diagram showing a position at which a light emission angle distribution is measured in Example 1.

The illumination device of this example provided an amount of emitted light 1.26 times as much as an illumination device which employed a commercially available diffusion plate (having the transmissivity of approximately 50%) instead of the light guide plate, and presented a good light emission distribution (minimum value/maximum value=88%), as shown in FIG. 38. Further, as shown in FIG. 39, it was confirmed that the illumination device of this example presented the light emission angle distribution narrower than that of the illumination device which employed a diffusion plate. The light emission angle distribution was measured at a position distanced by 8 mm toward an adjacent CCFL from immediately above an associated CCFL which was defined at a distance of 0 mm.

EXAMPLE 2

An illumination device of Example 2 was the same as Example 1 except that prism sections 16 in light guide plate 14 in Example 1 was modified to have θ1=50° and θ2=90°.

The illumination device of Example 2 provided an amount of emitted light 1.24 times as much as the illumination device which employed a commercially available diffusion plate (having the transmissivity of approximately 50%) instead of the light guide plate, and presented a light emission distribution substantially as good as that of Example 1. The illumination device of Example 2 also presented a light emission angle distribution as good as that of Example 1.

EXAMPLE 3

An illumination device of Example 3 was the same as Example 1 except that prism sections 16 in light guide plate 14 in Example 1 was modified to have θ1=60° and θ2=80°.

Figure 41:
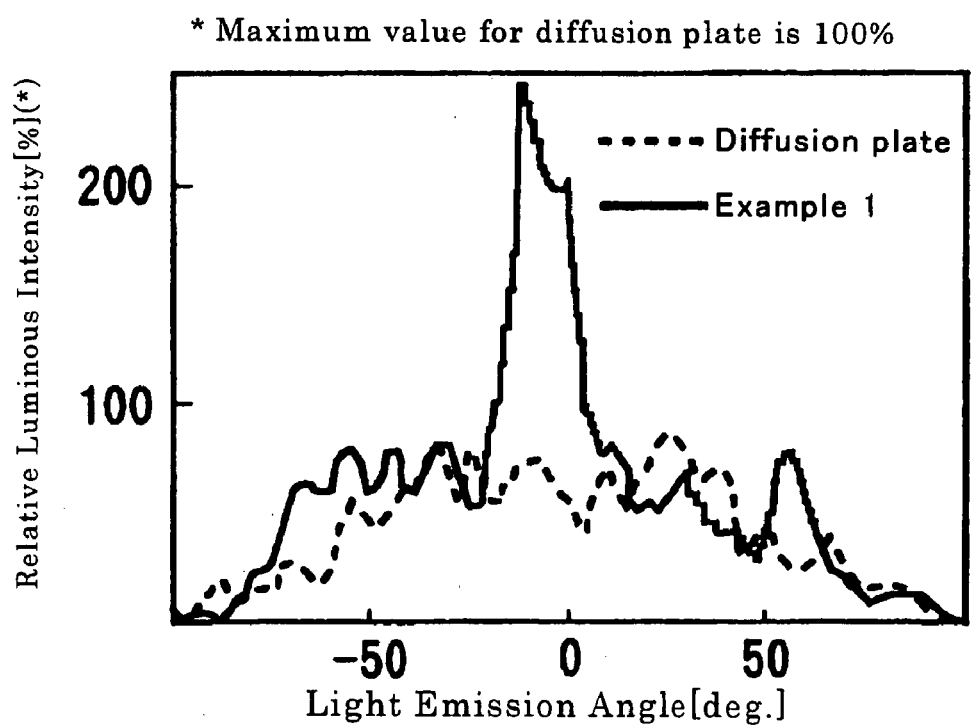
FIG. 41 is a graph showing the result of a measurement made on a light emission angle distribution in Example 3.
Figure 42:
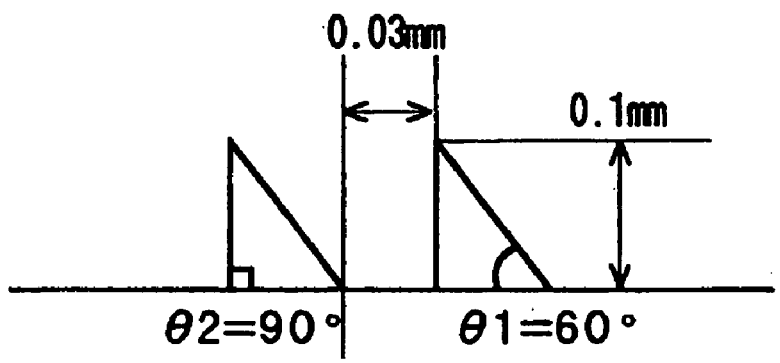
FIG. 42 is a schematic diagram showing the arrangement of prisms in Example 4.

The illumination device of Example 3 provided an amount of emitted light 1.26 times as much as the illumination device which employed a commercially available diffusion plate (having the transmissivity of approximately 50%) instead of the light guide plate, and presented a light emission distribution of minimum value/maximum value=83%. Further, as shown in FIG. 41, it was confirmed that the illumination device of Example 3 presented a light emission angle distribution narrower than that of the illumination device which employed a diffusion plate. The light emission angle distribution was measured at a position distanced by 10 mm toward an adjacent CCFL from immediately above an associated CCFL which was defined at a distance of 0 mm.

EXAMPLE 4

An illumination device of Example 4 was the same as Example 1 except that prism sections 16 in light guide plate 14 in Example 1 was modified to have θ1=60° and θ2=90°, and spacing L of 0.03 mm was taken between a prism plane which had an angle θ2 to the plane of the light guide plate and a prism plane which had an angle θ1 to the plane of the light guide plate.

The illumination device of Example 4 provided an amount of emitted light 1.19 times as much as the illumination device which employed a commercially available diffusion plate (having the transmissivity of approximately 50%) instead of the light guide plate, and presented a light emission distribution substantially as good as that of Example 1. The illumination device of Example 4 also presented a light emission angle distribution as good as that of Example 1.

COMPARATIVE EXAMPLE

An illumination device of Comparative Example was the same as Example 1 except that prism sections 16 in light guide plate 14 in Example 1 was modified to have θ1=60° and θ2=30°.

Figure 43:
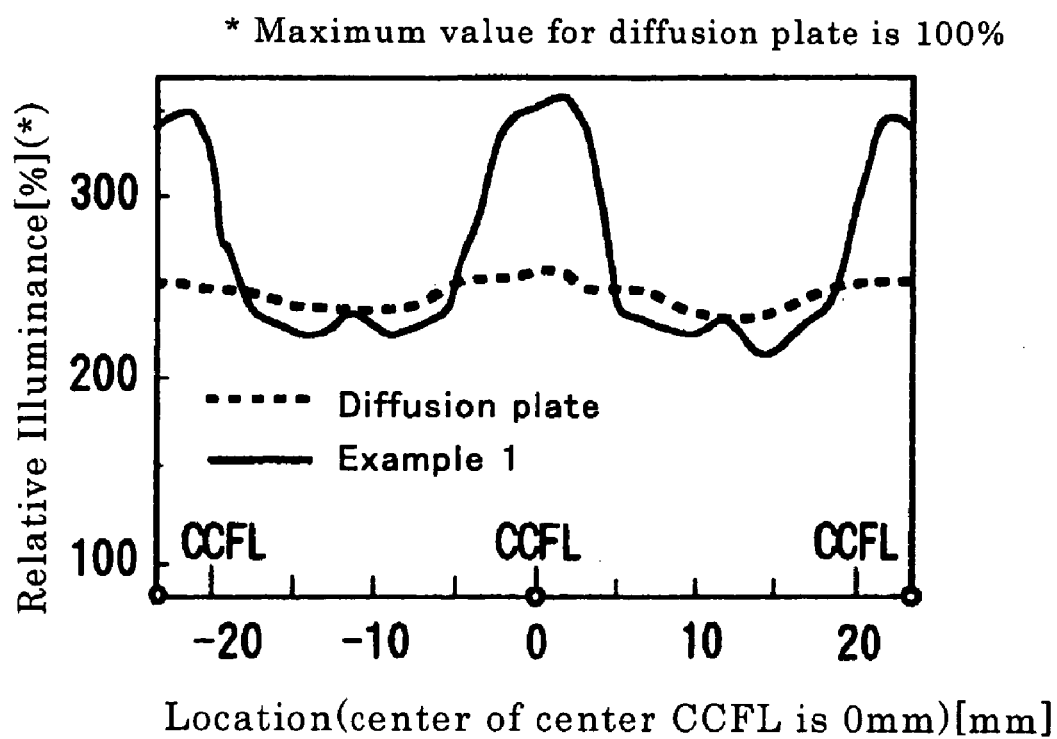
FIG. 43 is a graph showing the result of a measurement made on a light emission distribution in a comparative example.

The illumination device of Comparative Example, though providing an amount of emitted light 1.25 times as much as the illumination device which employed a commercially available diffusion plate (having the transmissivity of approximately 50%) instead of the light guide plate, presented a large light emission distribution (minimum value/maximum value=62%), as shown in FIG. 43.

While certain preferred embodiments of the present invention have been shown and described in detail, it should be understood that various changes and modifications may be made without departing from the spirit or scope of the appended claims.

What is claimed is:
1. An illumination device comprising:
 a light source; and
 a light guide plate for receiving light from said light source on a light incident plane thereof and emitting the light from a light emission plane thereof, wherein:

said light guide plate includes a light distributor disposed on said light emission plane, and a prism section disposed on said light incident plane, said light distributor is configured to cause part of the light incident from said light source to emit from said light guide plate as it is, and to reflect at least part of remaining light toward said prism section, said prism section is configured to refract and reflect the light incident thereon from said light distributor and the light incident thereon directly from said light source to guide at least part of the light to said light emission plane, and said illumination device satisfies the following equation:

$$D \leq P < \frac{2(r+d)}{\tan\left\{90° - \sin^{-1}\left(\frac{1}{n}\right)\right\}} + D$$

where r represents a distance between said light source and said light incident plane; d represents a thickness of said light guide plate; D represents a width of said light source in a direction parallel with said light emission plane; P represents a width of said light distributor in a direction parallel with said light emission plane; and n represents a relative refractive index of said light guide plate to air.

2. The illumination device according to claim 1, wherein said light source is a linear light source which extends in the direction parallel with said light emission plane.

3. The illumination device according to claim 1, wherein:
said light guide plate has said light incident plane and said light emission plane which are parallel with each other;
said light distributor has a reflection plane which forms an angle $\theta 3$ with a direction perpendicular to said light emission plane; and
said angle $\theta 3$ satisfies the following equations:

$$\theta 3 - \sin^{-1}\left(\frac{1}{n}\sin x0\right) < 90° - \sin^{-1}\left(\frac{1}{n}\right)$$

$$\tan^{-1}\left(\frac{d}{s}\right) < 2 \times \theta 3 - \sin^{-1}\left(\frac{1}{n}\sin x0\right) - 90°$$

$$x0 < \tan^{-1}\left\{\frac{P}{2 \times (r+d)}\right\}$$

where x0 represents an angle formed by the light incident on said light guide plate from said light source with a direction perpendicular to said light incident plane.

4. The illumination device according to claim 3, wherein said angle $\theta 3$ satisfies the following equation:

$$\tan^{-1}\left(\frac{2 \times d}{s}\right) \leq 2 \times \theta 3 - \sin^{-1}\left(\frac{1}{n}\sin x0\right) - 90° \leq \tan^{-1}\left(\frac{4 \times d}{s}\right).$$

5. The illumination device according to claim 1, wherein:
said light guide plate has said light incident plane and said light emission plane which are parallel with each other;
said light distributor has a reflection plane which forms an angle $\theta 3$ with a direction perpendicular to said light emission plane, and a reflection plane which forms an angle $\theta 4$ with a direction parallel with said light emission plane; and said angles $\theta 3$ and $\theta 4$ satisfy the following equations:

$$\theta 3 - \sin^{-1}\left(\frac{1}{n}\sin x0\right) < 90° - \sin^{-1}\left(\frac{1}{n}\right)$$

$$2 \times \theta 3 - \theta 4 - \sin^{-1}\left(\frac{1}{n}\sin x0\right) > \sin^{-1}\left(\frac{1}{n}\right)$$

$$\tan^{-1}\left(\frac{d}{s}\right) < 90° - 2 \times \theta 3 + 2 \times \theta 4 + \sin^{-1}\left(\frac{1}{n}\sin x0\right)$$

$$x0 < \tan^{-1}\left\{\frac{P}{2 \times (r+d)}\right\}$$

where x0 represents an angle formed by the light incident on said light guide plate from said light source with a direction perpendicular to said light incident plane.

6. The illumination device according to claim 5, wherein said angles $\theta 3$ and $\theta 4$ satisfy the following equation:

$$\tan^{-1}\left(\frac{2 \times d}{s}\right) \leq 90° - 2 \times \theta 3 + 2 \times \theta 4 + \sin^{-1}\left(\frac{1}{n}\sin x0\right) \leq \tan^{-1}\left(\frac{4 \times d}{s}\right).$$

7. The illumination device according to claim 1, wherein:
said light guide plate has said light incident plane and said light emission plane which are parallel with each other,
said prism section has two prism planes, and
said illumination device satisfies the following equations:

$$\theta 1 > \gamma$$

$$90° - \sin^{-1}\left(\frac{1}{n}\right) < 2 \times \theta 1 - \gamma < 90° + \sin^{-1}\left(\frac{1}{n}\right)$$

$$\gamma = \sin^{-1}\left\{\frac{1}{n}\sin(\theta 2 - x0)\right\} - \theta 2 + 90°$$

where $x0 \leq \theta 2$ $$\gamma = 90° - \theta 2 - \sin^{-1}\left\{\frac{1}{n}\sin(\theta 2 - x0)\right\}$$

where $x0 > \theta 2$ $$x0 < \tan^{-1}\left(\frac{s}{r}\right)$$

where $\theta 1$ represents an angle of the prism plane closer to the light source which is the closest to said prism section to said light incident plane, ; $\theta 2$ represents an angle of the other prism plane further away from said closest light source to said light incident plane; n represents a relative refractive index of said light guide plate to air; s represents a distance between the adjacent light sources or a length of said light guide plate when there is one said light source; and x0 represents an angle formed by the light incident on said light guide plate from said light source with a direction perpendicular to said light incident plane.

8. The illumination device according to claim 7, wherein said angle x0 satisfies the following equation:

$$\tan^{-1}\left(\frac{s}{4 \times r}\right) \leq x0 \leq \tan^{-1}\left(\frac{s}{2 \times r}\right).$$

9. The illumination device according to claim 1, wherein:
said light guide plate has said light incident plane and said light emission plane which are parallel with each other,
said prism section has two prism planes, and
said illumination device satisfies the following equations:

$$90° - \theta1 \geq \alpha$$

$$\theta1 + \sin^{-1}\{n \times \sin(90° - \alpha - \theta1)\} > 90° \text{ where}$$

$$\alpha > \tan^{-1}\left(\frac{d}{s}\right)$$

$$0 < \theta1 - \beta2 < 90° - \sin^{-1}\left(\frac{1}{n}\right)$$

$$90° - \sin^{-1}\left(\frac{1}{n}\right) < 2 \times \theta1 - \beta2 \leq 90° + \sin^{-1}\left(\frac{1}{n}\right) \text{ where}$$

$$\beta1 = \theta1 + \sin^{-1}\{n \times \sin(90° - \alpha - \theta1)\} - 90°$$

$$\beta2 = 90° - \theta2 + \sin^{-1}\left\{\frac{1}{n} \times \sin(\theta2 + \beta1 - 90°)\right\}$$

where θ1 represents an angle of the prism plane closer to the light source which is the closest to said prism section to said light incident plane; θ2 represents an angle of the other prism plane further away from the closest light source to said light incident plane; α represents an angle formed by the light reflected by said light distributor with said light emission plane; and s represents a distance between the adjacent light sources or a length of said light guide plate when there is one said light source.

10. The illumination device according to claim 9, wherein said angle α satisfies the following equation.

$$\tan^{-1}\left(\frac{2 \times d}{s}\right) \leq \alpha \leq \tan^{-1}\left(\frac{4 \times d}{s}\right).$$

11. The illumination device according to claim 1, wherein:
said light guide plate has said light incident plane and said light emission plane which are parallel with each other,
said prism section has two prism planes, and
said illumination device satisfies the following equations:

$$90° - \theta1 \geq \alpha$$

$$\theta1 + \sin^{-1}\{n \times \sin(90° - \alpha - \theta1)\} > 90° \text{ where}$$

$$\alpha > \tan^{-1}\left(\frac{d}{s}\right)$$

$$0 < \theta1 - \beta4 < 90° - \sin^{-1}\left(\frac{1}{n}\right)$$

$$90° - \sin^{-1}\left(\frac{1}{n}\right) < 2 \times \theta1 - \beta4 \leq 90° + \sin^{-1}\left(\frac{1}{n}\right) \text{ where}$$

$$\beta1 = \theta1 + \sin^{-1}\{n \times \sin(90° - \alpha - \theta1)\} - 90°$$

$$\beta2 = 90° - \theta2 + \sin^{-1}\left\{\frac{1}{n} \times \sin(\theta2 + \beta1 - 90°)\right\}$$

$$\beta4 = \sin^{-1}\left[\frac{1}{n}\sin\{\theta1 + \theta2 + \sin^{-1}\{n \times \sin(90° - \beta2 - \theta1)\} - 180°\}\right] + 90° - \theta2$$

where θ1 represents an angle of the prism plane closer to the light source which is the closest to said prism section to said light incident plane; θ2 represents an angle of the other prism plane further away from the closest light source to said light incident plane; α represents an angle formed by the light reflected by said light distributor with said light emission plane; and s represents a distance between the adjacent light sources or a length of said light guide plate when there is one said light source.

12. The illumination device according to claim 11, wherein said angle α satisfies the following equation.

$$\tan^{-1}\left(\frac{2 \times d}{s}\right) \leq \alpha \leq \tan^{-1}\left(\frac{4 \times d}{s}\right).$$

13. The illumination device according to claim 1, wherein:
said light guide plate has said light incident plane and said light emission plane which are parallel with each other,
said prism section has two prism planes, and
said illumination device satisfies the following equations:

$$90° - \theta1 \geq \alpha$$

$$\theta1 + \sin^{-1}\{n \times \sin(90° - \alpha - \theta1)\} > 90° \text{ where}$$

$$\alpha > \tan^{-1}\left(\frac{d}{s}\right)$$

$$0 < \theta1 - \beta7 < 90° - \sin^{-1}\left(\frac{1}{n}\right)$$

$$90° - \sin^{-1}\left(\frac{1}{n}\right) < 2 \times \theta1 - \beta7 \leq 90° + \sin^{-1}\left(\frac{1}{n}\right) \text{ where}$$

$$\beta1 = 90° - \theta1 - \sin^{-1}\{n \times \sin(90° - \alpha - \theta1)\}$$

$$\beta5 = \theta2 + \sin^{-1}\left\{\frac{1}{n} \times \sin(90° + \beta1 - \theta2)\right\} - 90°$$

$$\beta6 = \theta1 + \sin^{-1}\{n \times \sin(90° - \beta5 - \theta1)\} - 90°$$

$$\beta7 = 90° - \theta2 + \sin^{-1}\left\{\frac{1}{n} \times \sin(\theta2 + \beta6 - 90°)\right\}$$

where θ1 represents an angle of the prism plane closer to the light source which is the closest to said prism section to said light incident plane; θ2 represents an angle of the other prism plane further away from the closest light source to said light incident plane; α represents an angle formed by the light reflected by said light distributor with said light emission plane; and s represents a distance between the adjacent light sources or a length of said light guide plate when there is one said light source.

14. The illumination device according to claim 13, wherein said angle α satisfies the following equation.

$$\tan^{-1}\left(\frac{2 \times d}{s}\right) \leq \alpha \leq \tan^{-1}\left(\frac{4 \times d}{s}\right).$$

15. The illumination device according to claim 1, wherein:
said light guide plate has said light incident plane and said light emission plane which are parallel with each other,
said prism section has two prism planes, and
said illumination device satisfies the following equations:

$$90° - \theta1 \geq \alpha$$

$$\theta1 + \sin^{-1}\{n \times \sin(90° - \alpha - \theta1)\} \leq 90° \text{ where}$$

$$\alpha > \tan^{-1}\left(\frac{d}{s}\right)$$

$$0 < \theta1 - \beta9 < 90° - \sin^{-1}\left(\frac{1}{n}\right)$$

$$90° - \sin^{-1}\left(\frac{1}{n}\right) < 2 \times \theta1 - \beta9 \leq 90° + \sin^{-1}\left(\frac{1}{n}\right) \text{ where}$$

$$\beta1 = 90° - \theta1 - \sin^{-1}\{n \times \sin(90° - \alpha - \theta1)\}$$

$$\beta5 = \theta2 + \sin^{-1}\left\{\frac{1}{n} \times \sin(90° + \beta1 - \theta2)\right\} - 90°$$

$$\beta6 = \theta1 + \sin^{-1}\{n \times \sin(90° - \beta5 - \theta1)\} - 90°$$

$$\beta7 = 90° - \theta2 + \sin^{-1}\left\{\frac{1}{n} \times \sin(\theta2 + \beta6 - 90°)\right\}$$

$$\beta9 = \sin^{-1}\left[\frac{1}{n}\sin\{\theta1 + \theta2 + \sin^{-1}\{n \times \sin(90° + \beta7 - \theta1)\} - 180°\}\right] + 90° - \theta2$$

where θ1 represents an angle of the prism plane closer to the light source which is the closest to said prism section to said light incident plane; θ2 represents an angle of the other prism plane further away from the closest light source to said light incident plane; α represents an angle formed by the light reflected by said light distributor with said light emission plane; and s represents a distance between the adjacent light sources or a length of said light guide plate when there is one said light source.

16. The illumination device according to claim 15, wherein said angle α satisfies the following equation.

$$\tan^{-1}\left(\frac{2 \times d}{s}\right) \leq \alpha \leq \tan^{-1}\left(\frac{4 \times d}{s}\right).$$

17. The illumination device according to claim 1, wherein said prism sections are bilaterally symmetric about said light source when there is one said light source, and about a midpoint between said light sources when there are two said light sources.

18. The illumination device according to claim 1, wherein said light distributor is formed of repetitions of a plane which transmits the light from said light source and a plane which reflects the light from said light source.

19. A liquid crystal display device comprising the illumination device according to claim 1.

20. An illumination device comprising:

a light source; and a light guide plate for receiving light from said light source on a light incident plane thereof and emitting the light from a light emission plane thereof, wherein:

said light guide plate includes a light distributor disposed on said light incident plane, and a prism section disposed on said light incident plane in a region in which said light distributor is not disposed, said light distributor is configured to cause part of the light incident from said light source to emit from said light guide plate as it is, and to refract at least part of remaining light so that said light is reflected by said light emission plane, said prism section is configured to refract and reflect the light reflected by said light emission plane and incident thereon and the light incident thereon directly from said light source to guide at least part of the light to said light emission plane, and said illumination device satisfies the following equation:

$$D \leq P < \frac{2r}{\tan\{90° - \sin^{-1}\left(\frac{1}{n}\right)\}} + D.$$

where r represents a distance between said light source and said light incident plane; D represents a width of said light source in a direction parallel with said light emission plane; P represents a width of said light distributor in a direction parallel with said light emission plane; and n represents a relative refractive index of said light guide plate to air.

21. The illumination device according to claim 20, wherein said light source is a linear light source which extends in the direction parallel with said light emission plane.

* * * * *